US007155739B2

(12) United States Patent
Bari et al.

(10) Patent No.: US 7,155,739 B2
(45) Date of Patent: Dec. 26, 2006

(54) METHOD AND SYSTEM FOR SECURE REGISTRATION, STORAGE, MANAGEMENT AND LINKAGE OF PERSONAL AUTHENTICATION CREDENTIALS DATA OVER A NETWORK

(75) Inventors: Jonathan H. Bari, Philadelphia, PA (US); Scott R. Elkins, Philadelphia, PA (US); Joshua Hartmann, New York, NY (US)

(73) Assignee: JBIP, LLC, Philadelphia, PA (US)

( * ) Notice: Subject to any disclaimer, the term of this patent is extended or adjusted under 35 U.S.C. 154(b) by 1172 days.

(21) Appl. No.: 09/759,225

(22) Filed: Jan. 16, 2001

(65) Prior Publication Data

US 2002/0023059 A1    Feb. 21, 2002

(51) Int. Cl.
*H04L 9/32* (2006.01)
*G06F 21/20* (2006.01)
*G06Q 30/00* (2006.01)

(52) U.S. Cl. .................................. 726/6; 726/7; 705/26
(58) Field of Classification Search ................ 380/255; 713/200–201
See application file for complete search history.

(56) References Cited

U.S. PATENT DOCUMENTS

| | | | | |
|---|---|---|---|---|
| 5,241,594 A | 8/1993 | Kung | ......................... | 713/151 |
| 5,594,227 A | 1/1997 | Deo | .......................... | 235/380 |
| 5,671,414 A | 9/1997 | Nicolet | ....................... | 395/684 |
| 5,689,638 A | 11/1997 | Sadovsky | .............. | 395/188.01 |
| 5,719,941 A | 2/1998 | Swift et al. | ................... | 380/25 |
| 5,754,890 A | 5/1998 | Holmdahl et al. | .......... | 395/883 |
| 5,784,565 A | 7/1998 | Lewine | .................. | 395/200.59 |
| 5,790,785 A * | 8/1998 | Klug et al. | ................. | 713/202 |
| 5,815,689 A | 9/1998 | Shaw et al. | ................. | 395/551 |
| 5,867,646 A | 2/1999 | Benson et al. | .............. | 395/186 |
| 5,872,850 A | 2/1999 | Klein et al. | .................... | 705/51 |
| 5,878,141 A | 3/1999 | Daly et al. | ..................... | 380/25 |
| 5,889,996 A | 3/1999 | Adams | ........................ | 395/705 |
| 5,892,828 A | 4/1999 | Perlman | ...................... | 380/25 |
| 5,913,038 A | 6/1999 | Griffiths | ................ | 395/200.61 |
| 5,915,001 A | 6/1999 | Uppaluru | ................. | 379/88.22 |

(Continued)

FOREIGN PATENT DOCUMENTS

EP    0 848 341 A1    6/1998

(Continued)

OTHER PUBLICATIONS

Baboo.com website; Browse and Bookmark; 1998-2000.

(Continued)

*Primary Examiner*—Christopher A. Revak
(74) *Attorney, Agent, or Firm*—Morgan, Lewis & Bockius, LLP

(57) ABSTRACT

A method and system for registering, storing and managing personal data for use over a network, and for allowing users to register for, link to and log onto third party Web sites. The invention queries a user for registration, authentication credentials information, such as user names, passwords, etc., for any type of application, and securely stores this data in a centralized user database. The invention prompts when registration/authentication is needed, and either manually with user intervention or automatically with user permission inputs stored data, or automatically creates the registration/authentication credential data for the user. The invention further monitors a user's network browsing, detects when registration/authentication is needed, and either manually with user intervention or automatically with user permission inputs stored data, or automatically creates the registration/authentication credential data for the user. The invention then securely transmits authentication credentials data for automatic login at third party Web sites.

66 Claims, 16 Drawing Sheets

U.S. PATENT DOCUMENTS

| | | | | |
|---|---|---|---|---|
| 5,918,009 | A | | 6/1999 | Gehani et al. .......... 395/187.01 |
| 5,966,705 | A | | 10/1999 | Koneru et al. .................. 707/9 |
| 5,983,310 | A | | 11/1999 | Adams ........................... 711/6 |
| 6,000,033 | A | * | 12/1999 | Kelley et al. ................ 713/201 |
| 6,006,333 | A | | 12/1999 | Nielsen ....................... 713/202 |
| 6,049,777 | A | | 4/2000 | Sheena et al. ................. 705/10 |
| 6,092,049 | A | | 7/2000 | Chislenko et al. ............. 705/10 |
| 6,112,186 | A | | 8/2000 | Bergh et al. ................... 705/10 |
| 6,327,574 | B1 | * | 12/2001 | Kramer et al. ................. 705/14 |
| 6,327,659 | B1 | | 12/2001 | Boroditsky et al. .......... 713/182 |
| 6,332,192 | B1 | | 12/2001 | Boroditsky et al. .......... 713/168 |

FOREIGN PATENT DOCUMENTS

| | | |
|---|---|---|
| EP | 0 871 114 A2 | 10/1998 |
| EP | 0 871 115 A2 | 10/1998 |
| EP | 0 871 116 A2 | 10/1998 |
| EP | 0 942 568 A2 | 9/1999 |
| JP | 11175474 A1 | 2/1999 |
| JP | 11155159 | 8/1999 |
| WO | WO 98/32066 | 7/1998 |
| WO | WO 99/35009 | 7/1999 |
| WO | WO 00/52900 | 9/2000 |
| WO | WO 200139031 A * | 5/2001 |

OTHER PUBLICATIONS

Press Release, Netscape Alumni's Stealth Company, The Itixs Project, Unveil Name—Backflip—and Introduces a New View of the Web—Your View; Nov. 29, 1999.

Press Release, "Brodia Receives $5 Million in First Round Venture Funding From Draper Fisher Jurvetson"; Jan. 20, 1999.

Desktop.com website; 1999.

Digitalme.com website; 1999.

eCode.com website; 1999.

epassword.com; Aug. 1999.

ezlogin.com website; 1999.

Gator.com.

4ibm.com website; IBM E-Commerce Wallet.

iPin.com website; 1997.

i-drive.com website; 1998.

mypassword.net website.

Netegrity.com website.

$onMoney.com website.

Passport.com website.

PasswordSafe.com website.

Qpass.com website.

Press Release, "VerticalOne Corporation to offer Internet User One-Stop for Managing Online Personal Content and Account Information"; May 25, 1999.

Press Release, "Yodlee.com Launches a Powerful New Consumer Service to Help You Take Control of Your Life Online"; Sep. 28, 1999.

PCT International Search Report; PCT/US 01/01249; Jul. 4, 2001; 3 pages.

* cited by examiner

METHOD AND SYSTEM FOR SECURE REGISTRATION, STORAGE, MANAGEMENT AND LINKAGE OF PERSONAL AUTHENTICATION CREDENTIALS DATA OVER A NETWORK

BACKGROUND OF THE INVENTION

1. Field of the Invention

The present invention relates to a method and system for securely registering, storing and managing users' authentication credentials data, such as unique user names, email addresses, account numbers, passwords, personal identification numbers (PINs), other personal information, and their respective permutations ("Authentication Credentials") over a network, and for securely transporting users' Authentication Credentials in order to link the users to and log the users onto third party Web sites and applications that are networked via the Internet, Extranet and/or Intranet.

2. Background of the Related Art

Advances in computer processing power and network communications have made information from a wide variety of sources available to users on computer networks. Computer networking allows network computer users to share information, software applications and hardware devices, and internetworking enables a set of physical networks to be connected into a single network, such as the Internet, Extranet(s) and/or Intranet(s). Computers connected to the Internet or connected to networks other than the Internet also have access to information stored on those networks. The World Wide Web ("Web"), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, numerical, graphical, audio, video, and animation information. Currently, Internet users primarily retrieve information from the Internet, through the Web, by "visiting" a Web site on a personal computer that is connected to the Internet. Of course, users can gain access to the Internet through many different types of devices, including, but not limited to, personal computers, wireline telephones, wireless telephones, personal digital assistants, television set-top boxes, digital television set-top boxes, and household appliances. Other devices will be known to those skilled in the art, and are within the scope of this invention.

One of the Internet's greatest strengths is the immediacy by which users can access information, including content, e-commerce, and applications, such as newspaper Web sites, online shopping sites, and Web-based e-mail sites, respectively. However, many of these sites require that the user be registered to view the site, require that each registered user have a unique set of Authentication Credentials, and require that the user log into that particular site or portion thereof that requires user authentication to take advantage of the third party Web site's offerings and/or applications. Logging into a Web site may need to occur at the commencement of a user's visit and/or during the visit to that Web site, and/or at the conclusion of that visit in order to check-out or complete the order. Other occurrences and timings of authentication requirements will be known to those skilled in the art, and are within the scope of this invention. Authentication Credentials are not necessarily a proper name, and may or may not intuitively correspond to the actual user, directly or indirectly, explicitly or implicitly. Moreover, Authentication Credentials, for example, a user name, password and/or PIN, required at two different sites may in fact differ with each site. Thus, the Internet's strength is mitigated when access to a particular Web site is thwarted because the user cannot remember his/her Authentication Credentials for a respective Web site.

No standard conventions are practiced with respect to protocols for Authentication Credentials on the Web. Thus, Authentication Credentials have varying requirements regarding minimum and maximum character length, case sensitivity, alphanumeric character sequences, special characters, fields, etc. Other Authentication Credentials' requirements will be known to those skilled in the art. Virtually no two Web sites have the same requirements. Moreover, users may find that their preferred Authentication Credentials, such as a user name, are not available on a particular third party Web site because, for example, the user name is already taken by another registered user or does not meet the Web site's criteria for Authentication Credentials. When this happens, users must create new Authentication Credentials for the third party site. Moreover, third party Web sites may assign users with randomly generated Authentication Credentials such as account numbers for airline frequent flyer accounts. While advances have been made in increasing the speed, devices, platforms and bands with which a user may access the Internet, and in improving content search capability and methodology, little has been done in mitigating the proliferation of Authentication Credentials, such as user names and passwords, and in improving the management of Authentication Credentials over the Internet. Moreover, this proliferation has adverse implications to consumer users, business users and the third party Web sites and businesses requiring their respective users to have and use Authentication Credentials. Adverse implications can include, for example, user frustration, abandoned shopping carts, high customer service costs, etc. Other adverse implications will be known to those skilled in the art.

SUMMARY OF THE INVENTION

Accordingly, the present invention is directed to a method and system for securely registering, storing and managing a user's unique Authentication Credentials, and other personal information, over a network, and for allowing users to link to and log onto other Web sites using his/her secure Authentication Credentials.

An object of the present invention is to provide a method and system to store and manage a user's various Authentication Credentials in a secure database using for example, firewall(s) which prevent unauthorized access and Secure Sockets Layer (SSL) technology which encrypts all communications, including, but not limited to data, between a user's Web browser and/or device, the inventive system's servers and third party Web site's servers.

It is another object of the present invention to aid in the registration of and/or to automatically register a user at a third party Web site to enable usage and/or commerce at that Web site.

Another object of the present invention is to automatically log a user onto a third party Web site by securely transmitting the stored Authentication Credentials to the third party.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, the present invention provides a method of managing and linking a user's personal authentication credentials data over a network, comprising the steps of registering the user with a secure system; creating a personal homepage and personal database for the user by the system; inputting the user's authentication credentials for a plurality of third parties into the personal database; linking to one of the plurality of third parties by the user; retrieving and securely transmitting appropriate authentication credentials for the one of the plurality of third parties by the system: and logging the user onto the one of the plurality of third party sites.

In another aspect, the present invention provides a method of creating business incentives during e-commerce comprising the steps of registering a user with a secure system; registering a third party merchant as a participating merchant with the system; creating a personal homepage and personal database for the user by the system; inputting the user's authentication credentials for a plurality of third parties, including at least one participating merchant, into the personal database; linking to the at least one participating merchant by the user; retrieving and securely transmitting appropriate authentication credentials for the at least one participating merchant by the system; logging the user onto the at least one participating merchant; purchasing a product by the user from the at least one participating merchant; and receiving, by the system, compensation from the participating merchant.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. The present invention is described below using, as an example, an inventive method and system used over the Internet. Of course, it will be apparent to those skilled in the art that the invention is not limited to Internet use, but encompasses all network-related options such as Intranets and/or Extranets.

Figure 1:
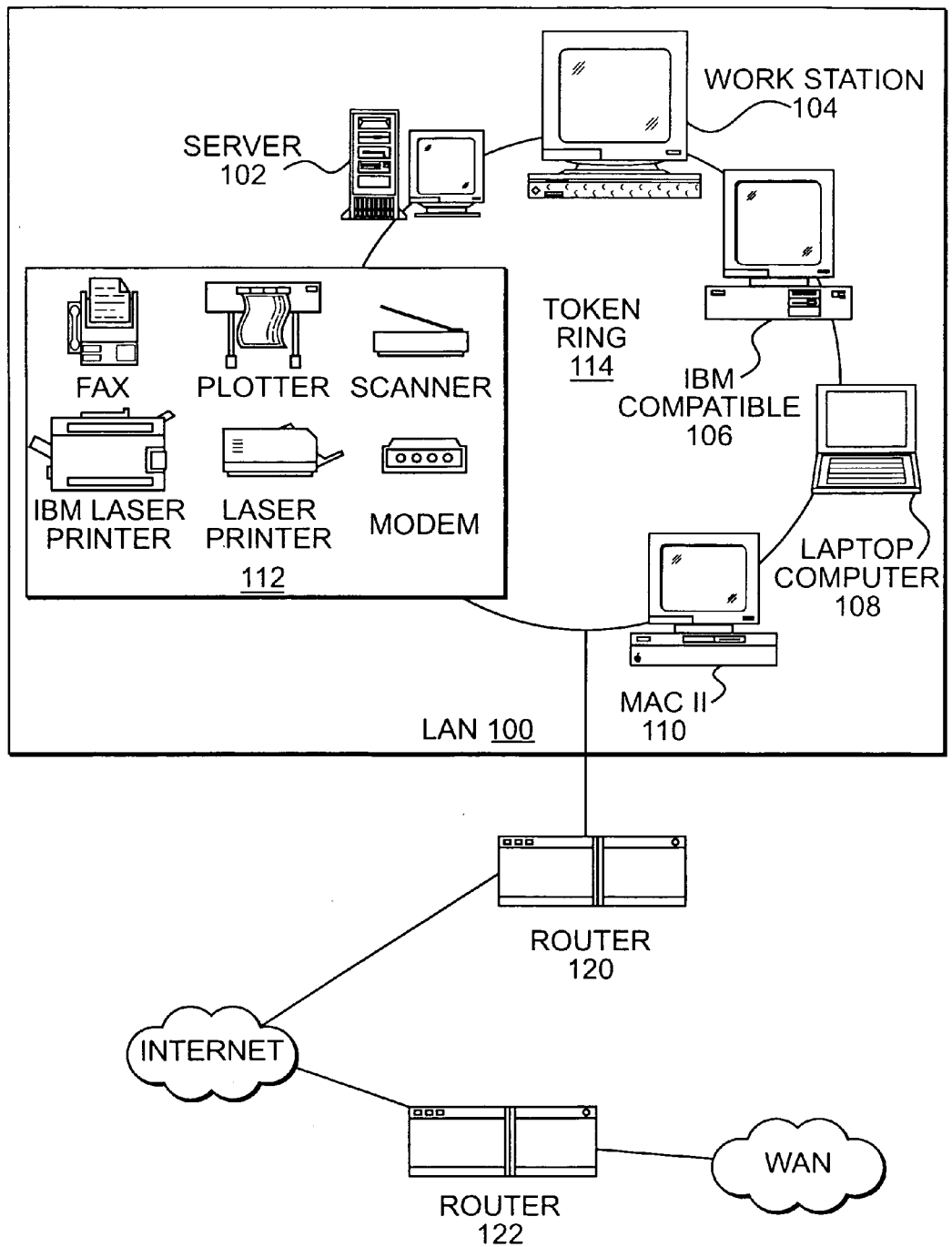
FIG. 1 illustrates a computer network in which the inventive information registration, storage and management may be incorporated.

FIG. 1 is an example of a local area network (LAN) 100 that is configured to utilize a non-repudiation protocol. LAN 100 comprises a server 102, four computer systems 104, 106, 108, and 110, and peripherals 112, such as printers and other devices that may be shared by components on LAN 100. Computer systems 104, 106, 108 and 110 may serve as clients for server 102 and/or as clients and/or servers for each other and/or for other components connected to LAN 100. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

Data may be transferred between components on LAN 100 in packets, i.e., blocks of data that are individually transmitted over LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to standard protocol. Computer networks connected to the Internet and to other networks typically use TCP/IP Layering Model Protocol. It should be noted that other Internet working protocols may be used, are known by those skilled in the art and are within the scope of this invention.

Figure 2:
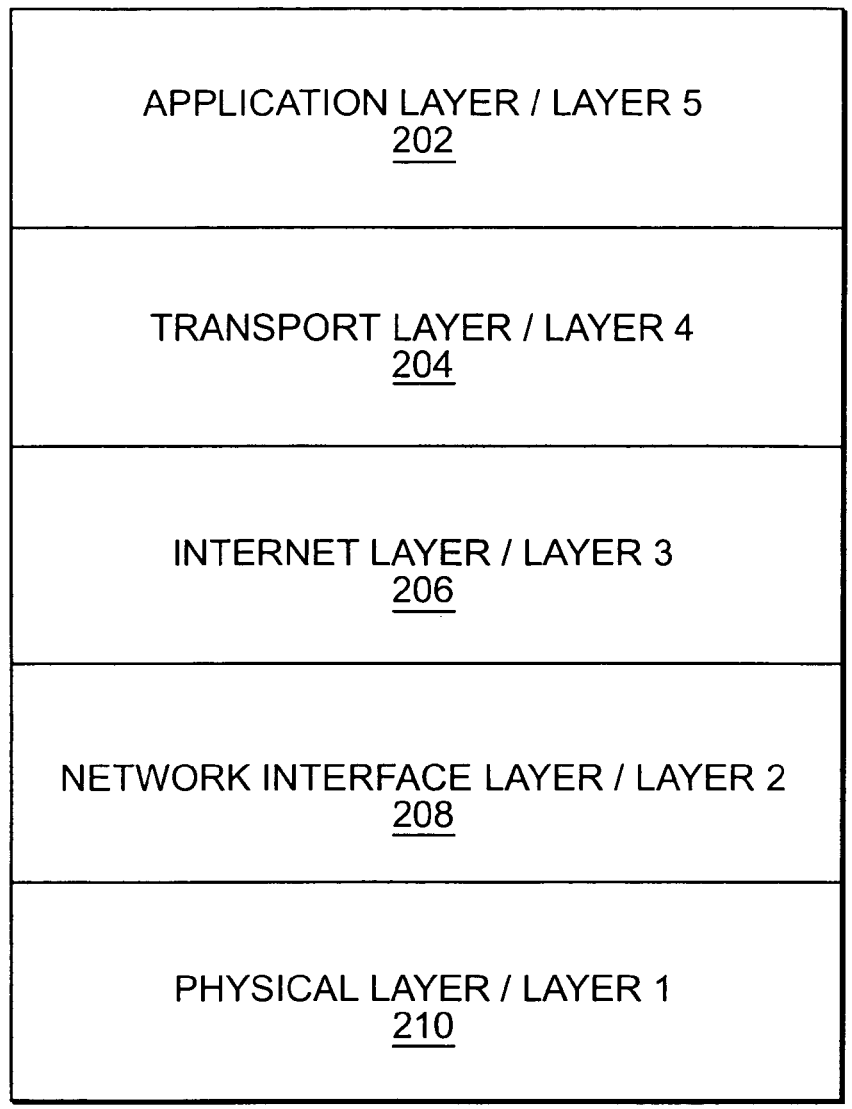
FIG. 2 illustrates the TCP/IP Layering Model Protocol used during communications between components on the computer network.

As illustrated in FIG. 2, the TCP/IP Layering Model comprises an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
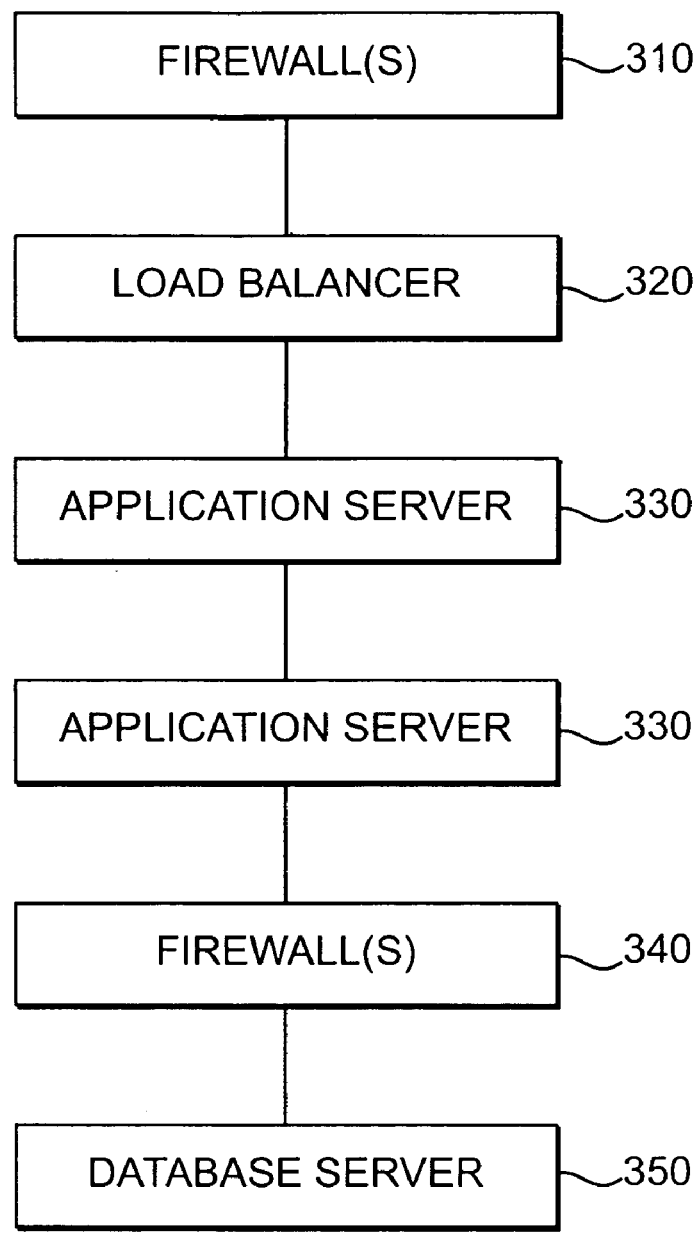
FIG. 3 is one embodiment of the inventive system that provides a representative example of the system's hardware and software architecture.

FIG. 3 illustrates one embodiment of the inventive system's architecture. In the preferred embodiment, behind the Web server are security layer(s) (shown as Firewall(s) 310 in FIG. 3), staging server and load balancer 320, and then application servers 330. The application servers provide a platform for a content management system that allows users (when appropriate) to update their personalized vault and service staff members (when appropriate) to develop, update and enhance the Web site. These application servers connect, through firewall(s) 340 to database servers 350 that store the user's Authentication Credentials, other personal information, discussed in more detail later, and Web site data for the particular third party Web site. The third party Web site can be virtually any Web site such as a content, e-commerce and/or application site, and will be known to those skilled in the art. The database servers have redundant configurations that provide full fault-tolerance.

Figure 4:
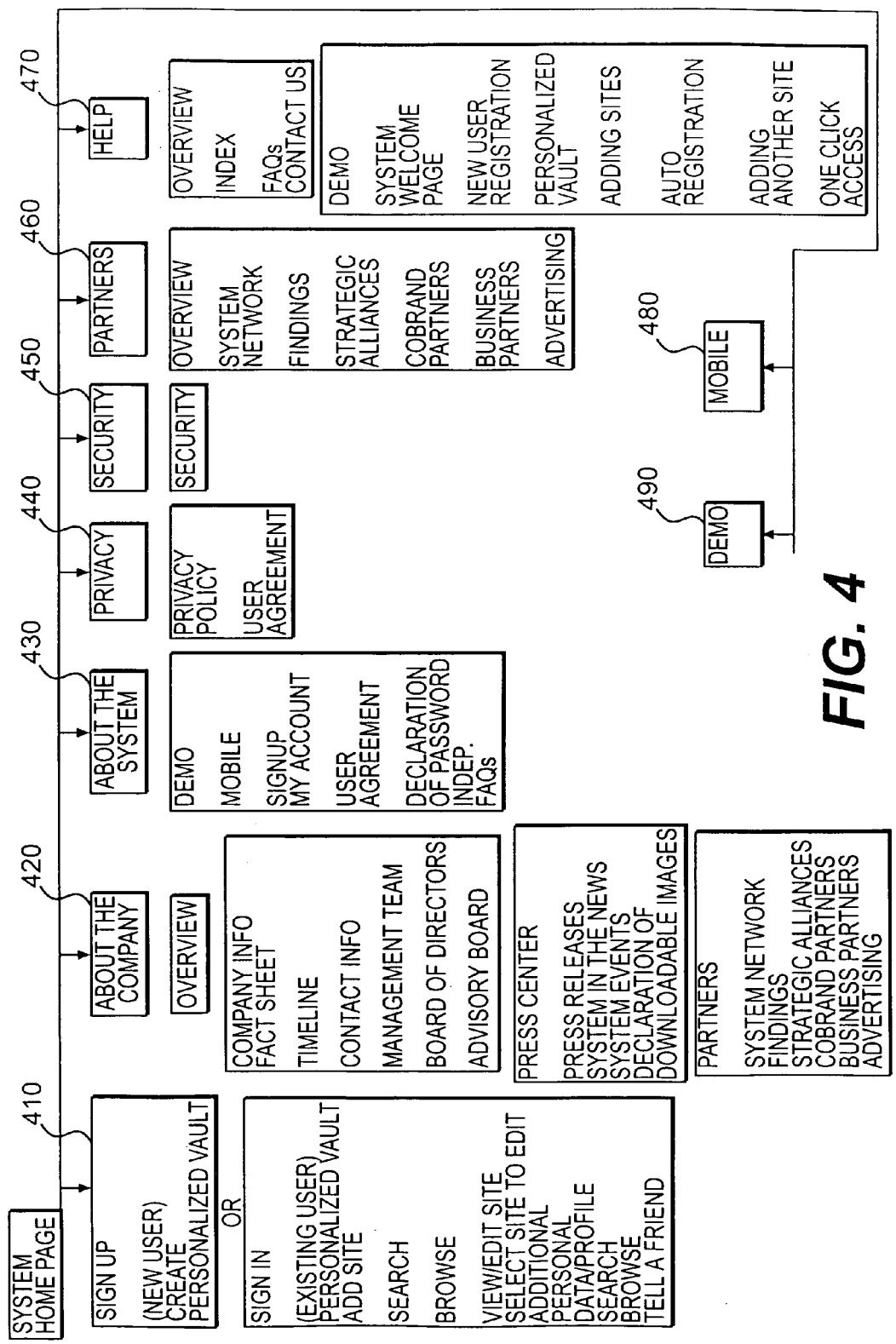
FIG. 4 is a site map of the preferred embodiment of the inventive system's Web site.

FIG. 4 illustrates a site map of the preferred embodiment of the inventive system's service. Specifically, FIG. 4 depicts the various information and functionality that an end user can attain by using the inventive system, the process for which will be discussed in more detail later. For example, in one embodiment of the present invention, the site map contains information about how a user may sign up for the system at 410, about the company behind the inventive system at 420, about the system itself at 430, about the privacy policy in place for users of the system at 440, the security in place in the system at 450, the business partners with the system at 460, how a user can get help in using the system at 470, how the user may use the system with a mobile device at 480, and a demonstration of how to use the system at 490.

Figure 5:
FIG. 5 is a screen shot of the inventive system that enables a user to register for and create a personalized vault containing secure Authentication Credentials according to a preferred embodiment of the inventive system.

FIG. 5 is a screen shot of a user interface for a Web page of a preferred embodiment of the system for securely registering, storing and managing a user's unique Authentication Credentials and other personal information over a network. Specifically, FIG. 5 illustrates how the inventive system enables a user to register with the system by creating an account which includes a personal profile that may detail various data points such as name, email address, physical mailing address, billing address, credit card information, age, gender, birthplace, etc. ("User Profile"). For a new user, the method includes a prompt for the user to input master authentication credentials, such as a master user name, which generally speaking is an email address, and password ("Master Authentication Credentials"). The Master Authentication Credentials are shown as the user's e-mail address and password, as shown as 510 and 520 in FIG. 5. Of course, other master credentials will be known to those skilled in the art and are within the scope of the present invention. Once a user is registered, the inventive system recognizes and authenticates the Master Authentication Credentials, which then unlocks the personalized vault containing Authentication Credentials for third party Web sites and the User Profile.

The Master Authentication Credentials may be any type of means of authentication, such as biometrics or new technological developments such as touchpad fingerprint detection, voice recognition, signature recognition, and other authentication known to those skilled in the art are within the scope of the present invention.

The system gives the user the option to add other personal information into the User Profile, at both the time of registration and over the course of time, either in part or in whole, and does not require that the user input all of the User Profile data initially and/or ever. For example, the user can add a physical mailing address, telephone number, credit card information, etc. All of this information is encrypted and saved within the inventive system, the process for which will be discussed in more detail later. The present invention also presents to the user guidelines in choosing a master password, shown as 530 in FIG. 5. The master user name and password are encrypted and stored for each user. Should the user forget the Master Authentication Credentials, the inventive system will supply "hints" to the user, such as the first and last character of the password. For security reasons, no person other than the user ever knows the username and password. Therefore, the user cannot contact an employee and/or agent of the inventive system and receive the password, nor can the user look up the password on the network.

Figure 6:
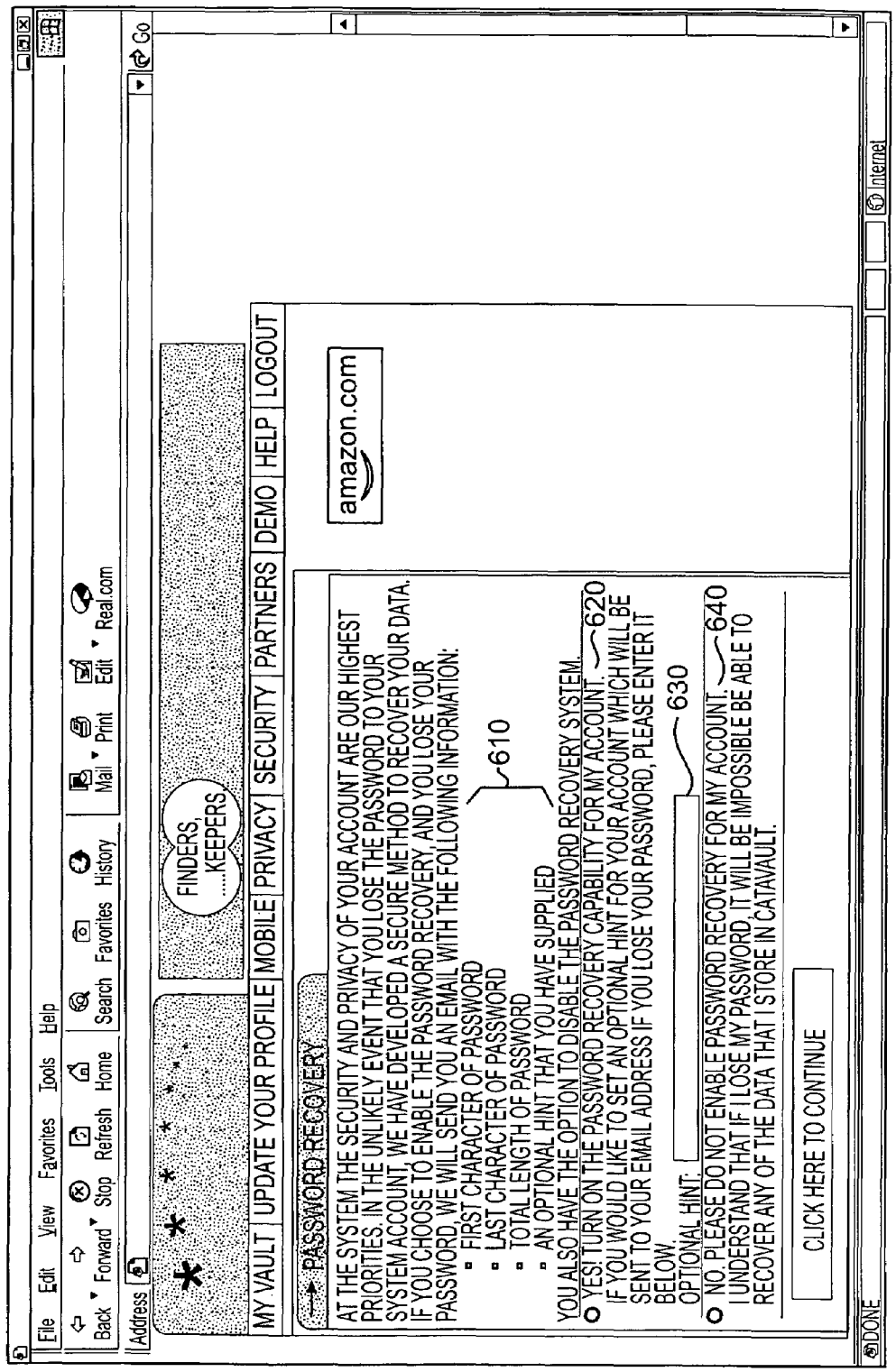
FIG. 6 is a screen shot of a page of the inventive system that enables a user to elect to recover or not to recover the Master Authentication Credentials' password, in the event that the user, for example, loses or forgets his/her password.

FIG. 6 illustrates the preferred embodiment for Master Authentication Credentials' password recovery. As shown at 610, a preferred embodiment of the present invention explains what the hint will encompass. In this particular example, the hint will include the first and last characters of the password, the total length of the password, and an optional hint that the user supplies. At 620, the user can click on the "Yes!" button in order to enable the hint functionality. At 630, the user may enter an optional hint regarding the password. At 640, the user instead may click on the "No" button, thus disabling the password recovery functionality altogether.

Figure 7:
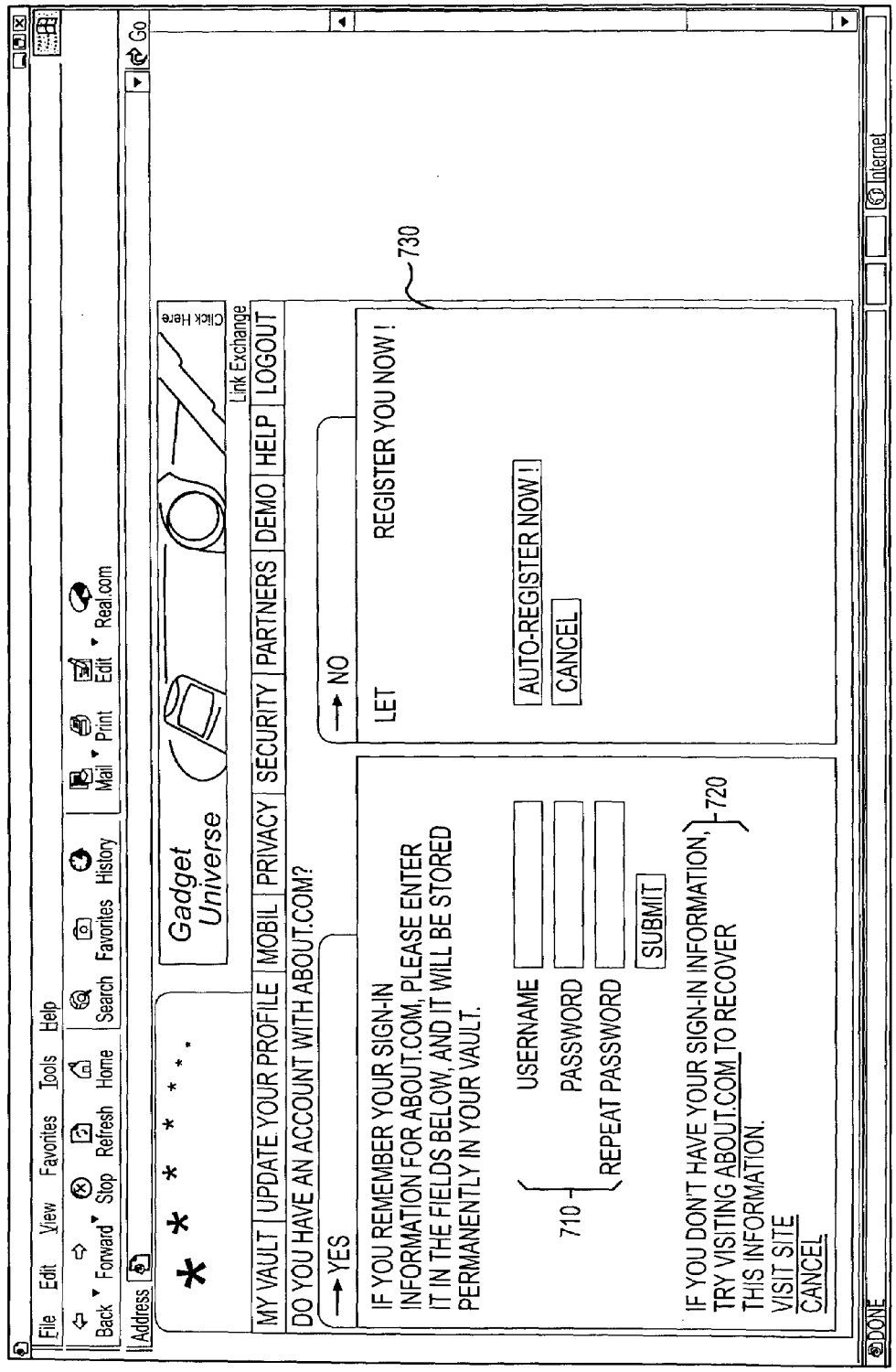
FIG. 7 is a screen shot of a page of the inventive system that enables a user to add and store an Authentication Credentials' link to third party Web sites in the personalized vault.

Once a user is registered for the inventive system, that user may input any type of information for storage and management to create their personalized vault which will be discussed in more detail later. FIG. 7 is a screen shot illustrating a preferred embodiment for user information input. As shown in FIG. 7, the user is prompted to input information for storage. If, for example, the user previously registered with about.com, and thus already has personal Authentication Credentials, which he/she remembers and knows for that third party Web site, the inventive system asks the user to input this information at 710. The inventive system automatically encrypts this information and stores it in the user's personalized vault. If the user cannot remember this information, the inventive system allows the user to link to the about.com Web site for assistance and registration at 720. If the user has never registered with about.com or wants a new account, the inventive system may automatically register the user with about.com at 730, the process for which will be discussed in more detail later.

Figure 8A:
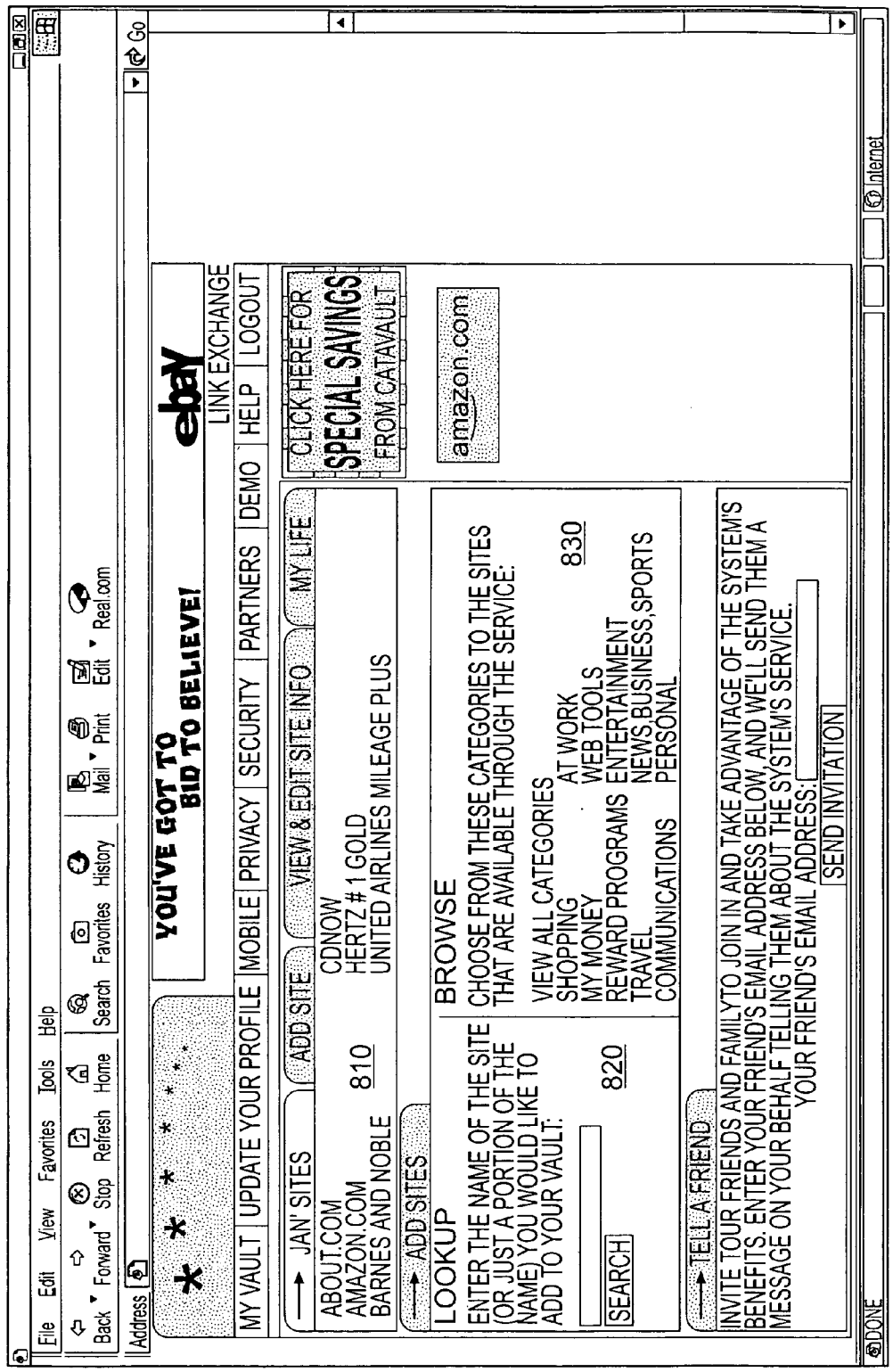
FIG. 8A is a screen shot of a page of the inventive system illustrating the personalized vault containing secure Authentication Credentials and the respective links to third party Web sites.

The personalized vault page, a personalized home page of sorts, is created for the user that will contain links to various pertinent Web sites for which the user has registered for and stored Authentication Credentials. FIG. 8A illustrates the preferred embodiment of the user's personalized vault. FIG. 8A includes a menu item to allow the user to add more third party Web sites to the personalized vault at 820 and 830. At 820, the user inputs the URL (or the name or a portion of the name) of the site desired in the search area. The inventive system will search the inventive system's network database of Web sites for the desired site. Once found, and under certain circumstances that will be discussed later, the inventive system will automatically register the user based upon the User Profile already stored in the personalized vault. Under other circumstances, the user will have already registered with a particular third party site, and will know/remember their Authentication Credentials. In this situation, the user will manually enter the Authentication Credentials into their personalized vault. In other circumstance(s), such as if the third party Web site is not part of the system's network database, the user will have to visit the third party Web site to register and then manually store their Authentication Credentials for that site in their personalized vault. The user also has the option of sending to the system a suggestion to add this third party Web site to the network database.

Figure 8B:
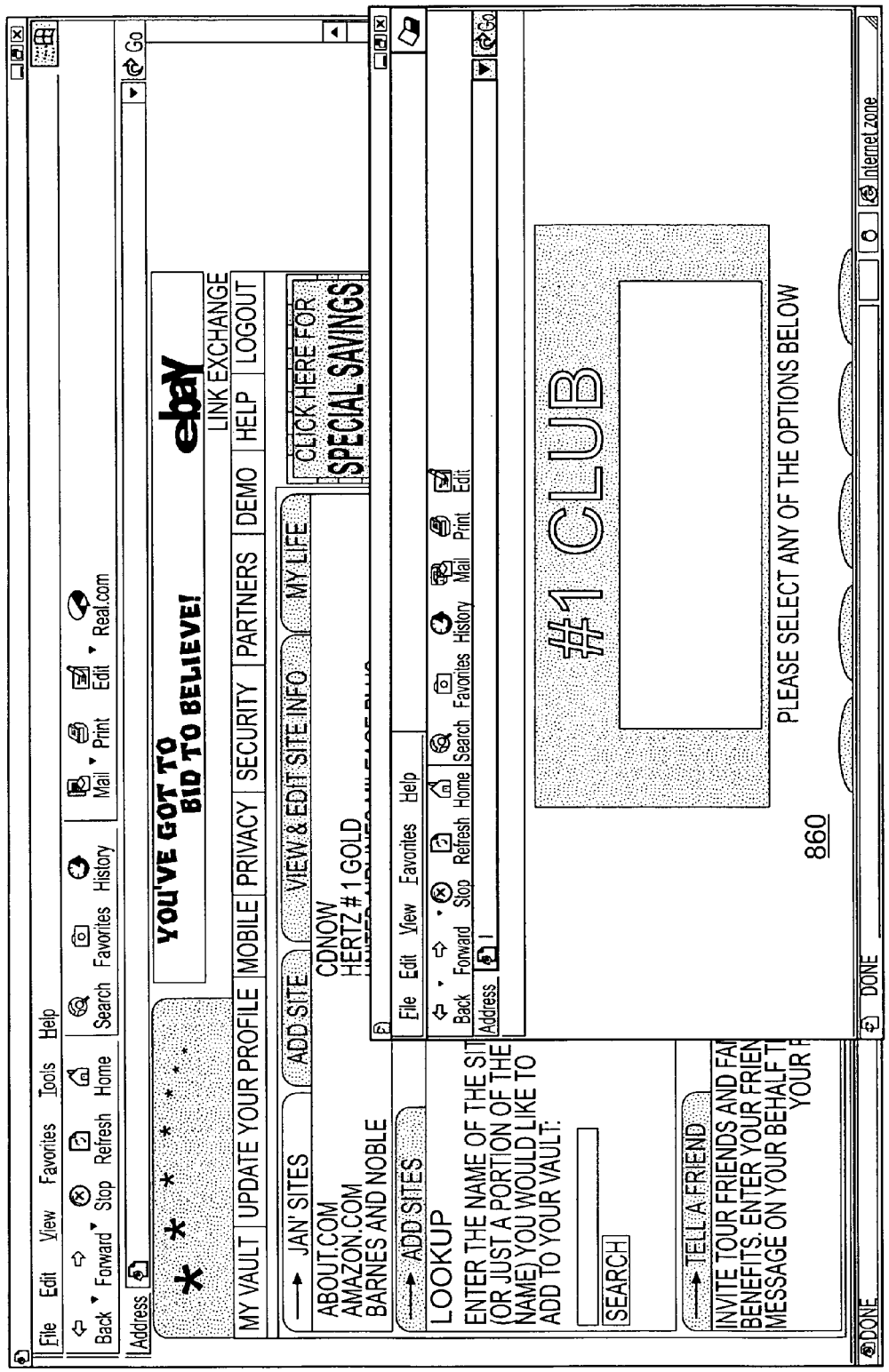
FIG. 8B is a screen shot illustrating how a user gains access to third party Web sites from the personalized vault.
Figure 8C:
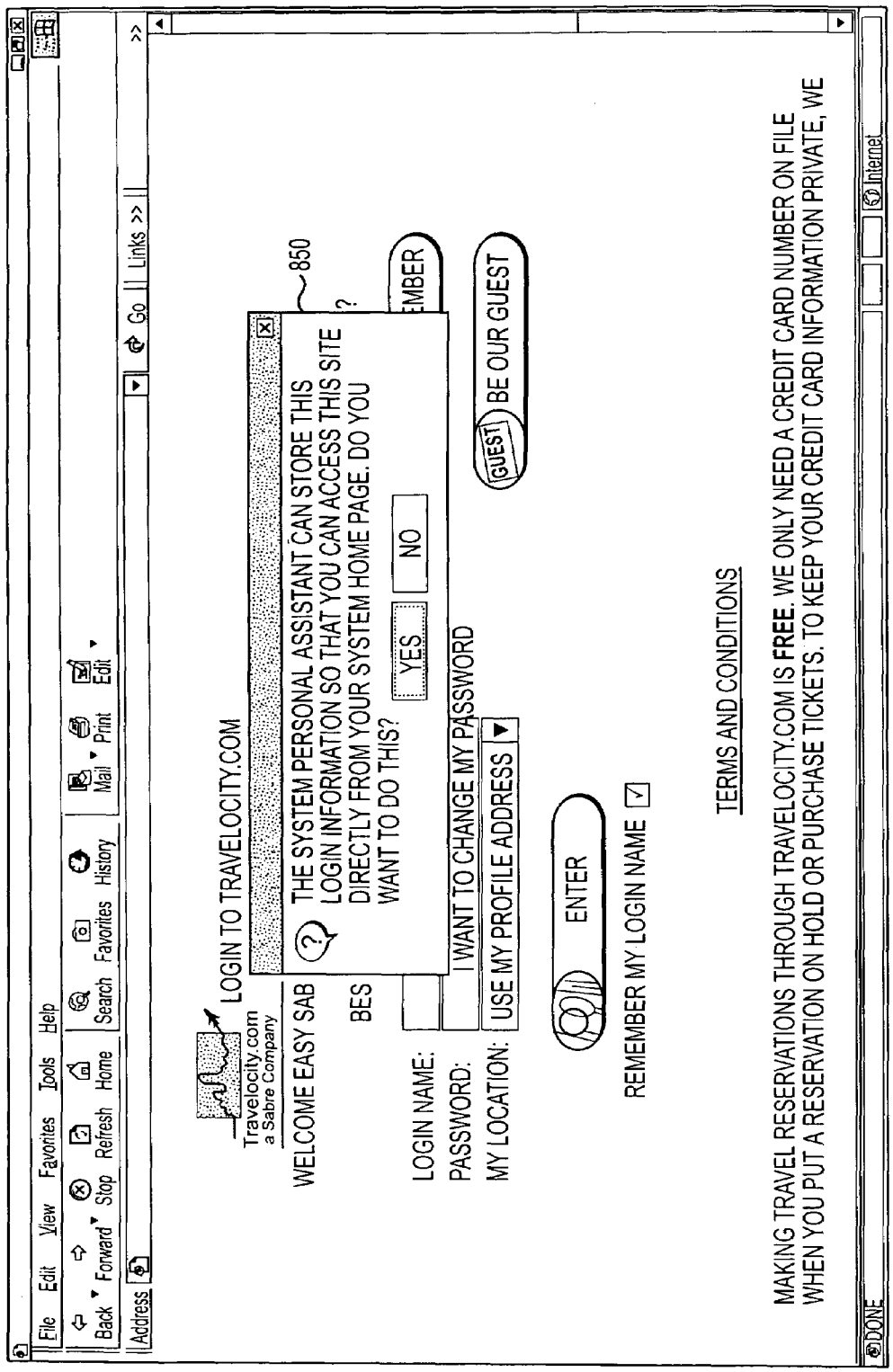
FIG. 8C is a screen shot illustrating how a user registers with a third party Web site and the inventive system automatically stores the information in the personalized vault.
Figure 9A:
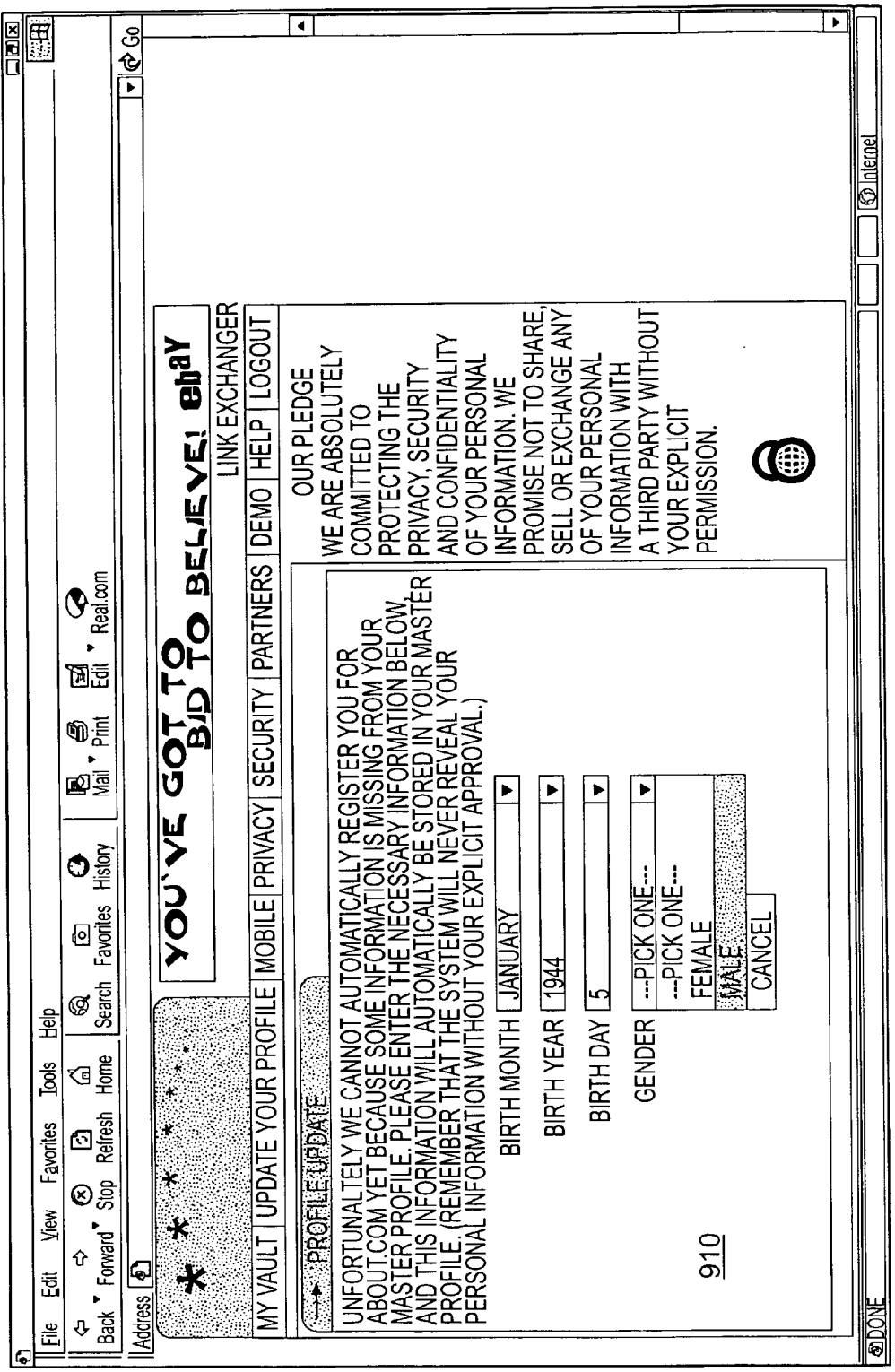
FIGS. 9A–D are screen shots illustrating the auto registration process for third party Web sites through the inventive system.
Figure 9B:
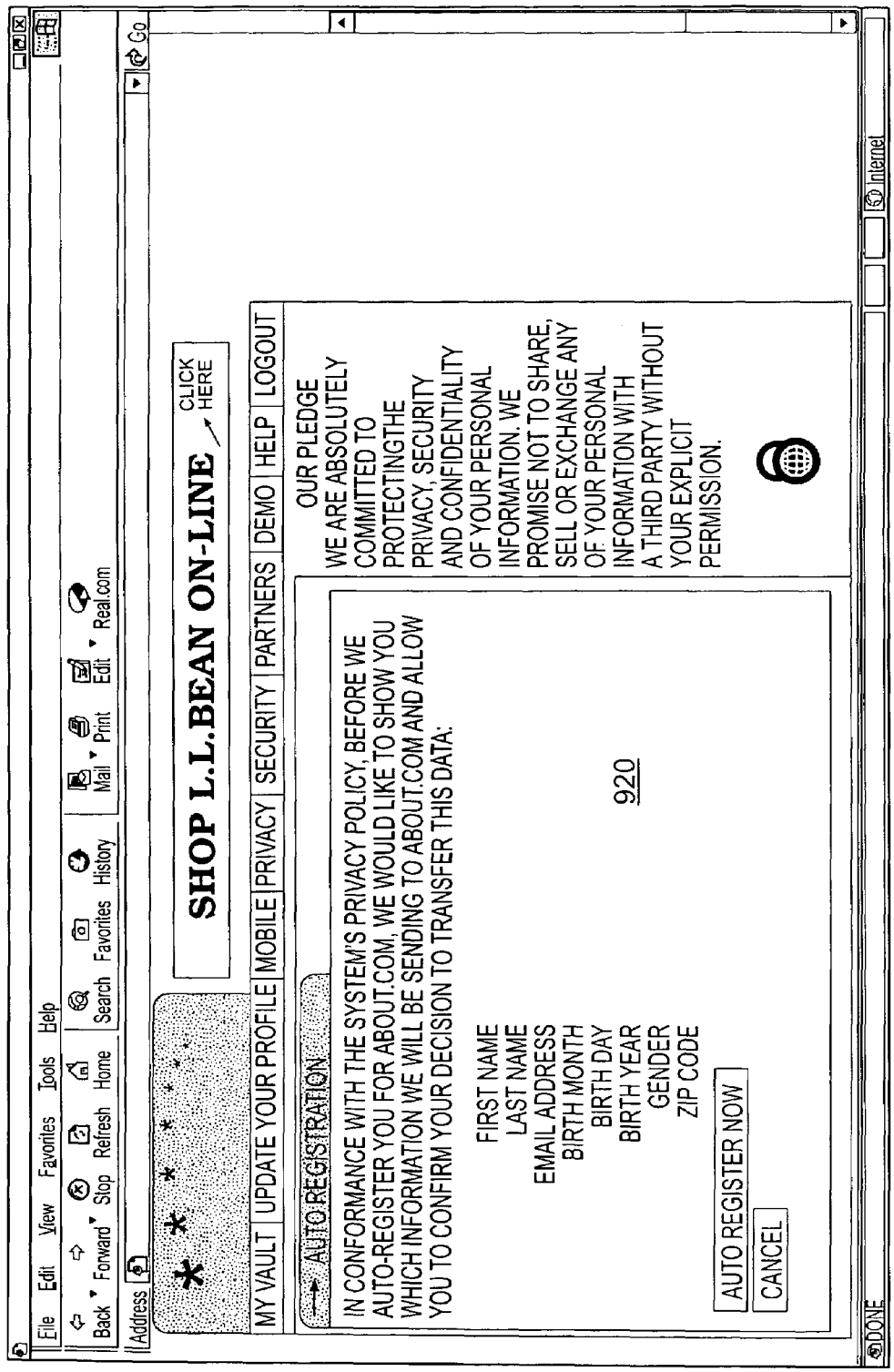
Figure 9C:
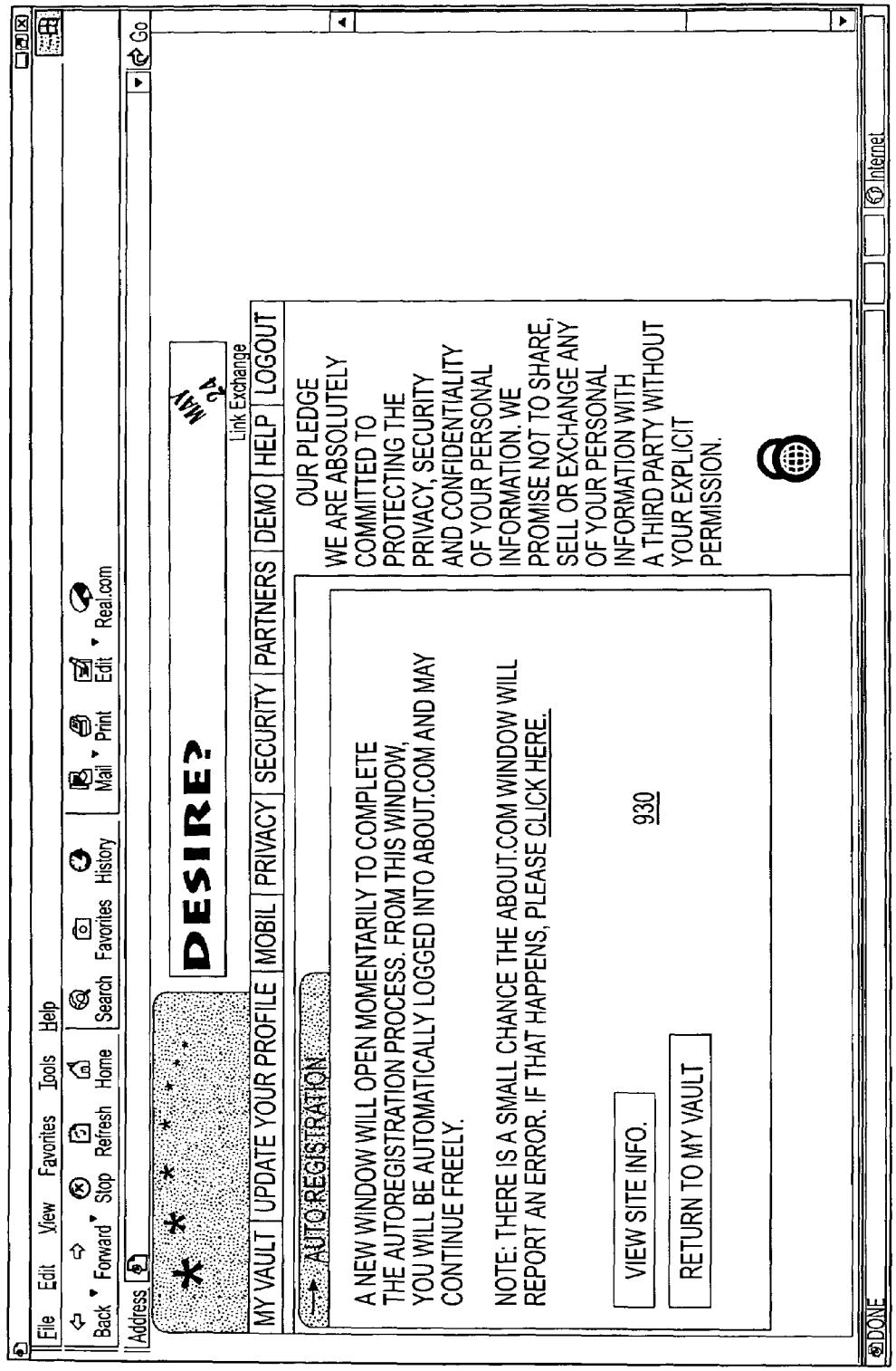
Figure 9D:
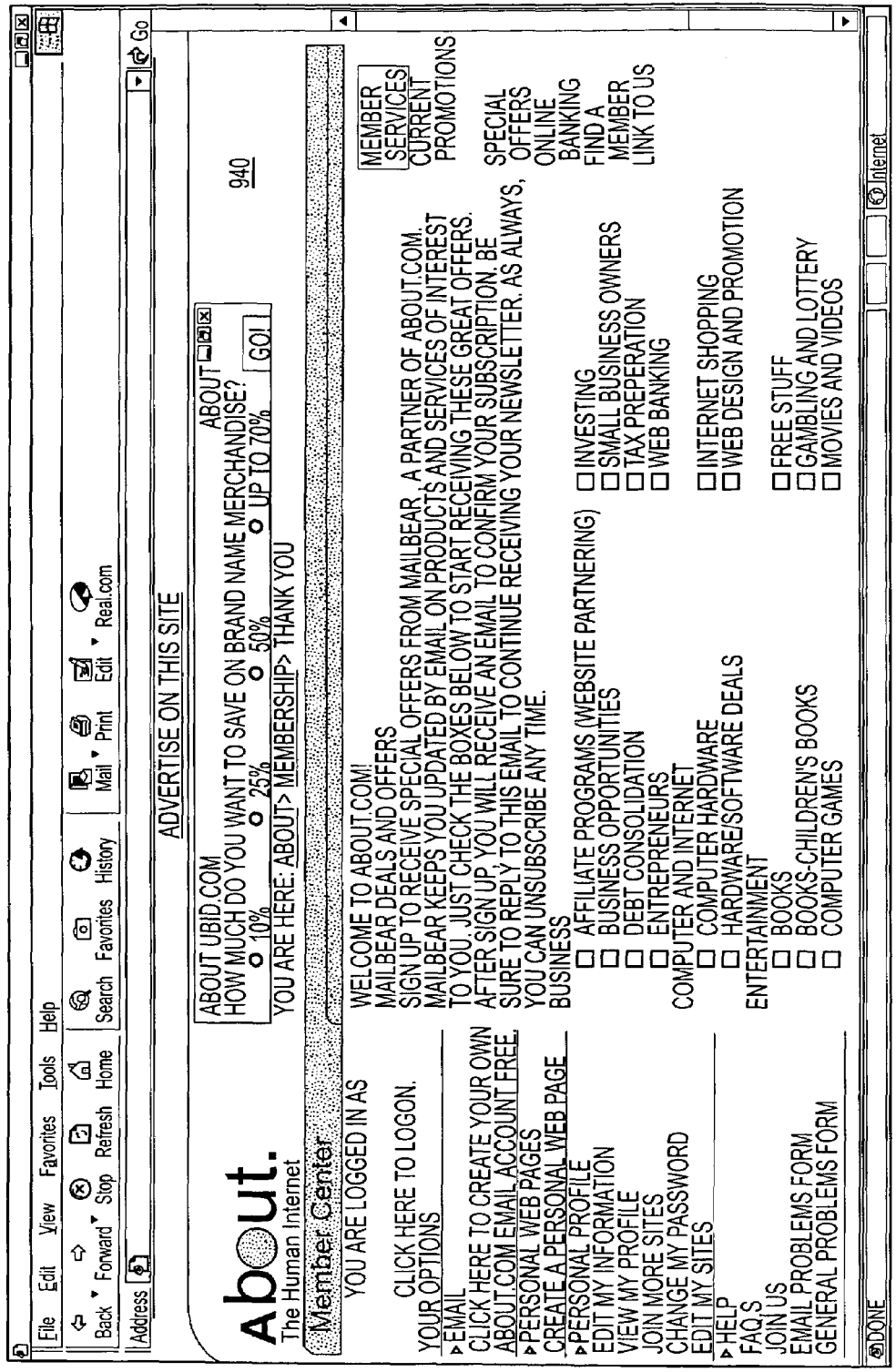

FIG. 8A also includes a browsing capability at 830. The inventive system presents a number of categories of Web sites, such as shopping, travel, and communications from which to choose a search or browse. The user clicks on a category and the inventive system automatically presents the user with pertinent and categorized Web sites that are available through the inventive system. Once the user finds a desired site, the inventive system as shown in FIG. 7 at 710 or may automatically register the user at the user's express direction at 730. As shown in FIG. 8C, the system also allows the user to manually register for the Web site at the user's express direction, and then add this new Web site's Authentication Credentials to the personalized vault at the user's express direction at 850.

The present invention also provides a service that will automatically register users with third party Web sites with or without the need for the personal assistant application, which will be discussed in more detail later. For example, the inventive system may contain a list of third party Web sites with which the system has a business relationship. The user may click on one or more of these listed third party sites. By so clicking on the selection, the inventive system will automatically register the user, using information stored in the profile from the user's User Profile, the personalized vault, and/or Authentication Credentials discussed above.

FIGS. 9A–D illustrate the process by which the inventive system will automatically register a user at a third party Web site. The profile stored in the user's personalized vault is an intelligent database to aid the user in registering for, storing and managing Authentication Credentials and User Profile data for third party Web sites. As discussed, each third party Web site requires different registration information. However, much of the information required is common across the various Web sites, such as name, physical mailing address, e-mail address, telephone number, etc. The data points for these common information requests may be stored for each user in his/her personal User Profile. Then, when the user goes to a new Web site for which registration is required, the inventive system searches the User Profile for the needed information. If the inventive system's User Profile does not have all of the user's information required to automatically register the user at a third party site, the inventive system will present a page of queries in order to register the user, as shown at 910 in FIG. 9A. At the same time, this new information is stored in the User Profile for future queries and uses by the inventive system and third party Web sites, at the express permission of the user. If and when the profile contains all the information required, the system can automatically input the registration information, and thus automatically register the user with the new Web site, as shown at 920 in FIG. 9B. When the system automatically registers a user at a third party Web site at the user's express permission, the system may create and then securely store the unique and sometimes randomly generated Authentication Credentials such as user name and password for the particular Web site in the personalized vault illustrated at 910. Immediately following the automatic registration, the system opens a new browser window at 930 in FIG. 9C, as will be discussed in more detail later, links the user to and logs the user onto the third party Web site as illustrated at 940 in FIG. 9D. The user may never need to know what the newly and automatically created Authentication Credentials are because the inventive system will automatically retrieve and transmit the Authentication Credentials to the Web site from the personalized vault whenever the user indicates a desire to log into the Web site.

The inventive system also allows the user to input and store any type of personal Authentication Credentials and other personal information in the personalized vault. For example, the personalized vault may contain two or more sections whereby users can store various and distinct data, including, but not limited to, User Profile, Authentication Credentials, and other personal information. One section in the personalized vault can include hypertext authenticated links with secure Authentication Credentials for third party Web sites. Another separate section of the personalized vault can contain Authentication Credentials for offline applications such as a home security system PIN and/or the password to reset a car stereo after it loses power from the battery. Additionally, for example, a user may wish to securely file their driver's license number and/or family members' social security number(s). This information is encrypted and stored in the personalized vault for that respective user. As with the Master Authentication Credentials, these Authentication Credentials can be any type known to those skilled in the art, such as, user names, passwords, PINs, biometrics and/or new technologies such as voice recognition, fingerprint recognition, and signature recognition. Moreover, the inventive system allows one user to maintain several different accounts in one personal vault.

In the personalized vault at 810 of FIG. 8A, a list of "preferred" Web sites for that user is presented. These preferred Web sites are sites for which the user has registered and stored Authentication Credentials. Thus, for example, when the user wants to get information or purchase a product from different Web sites for which data has been registered and stored, the user need only click on the name, logo and/or icon for that third party at 810. When the user clicks on the name, logo, and/or icon, the present invention automatically opens a new browser window, links or "transports" to that Web site, decrypts, and inputs the Authentication Credentials for the particular site (authenticating the user), and thus logs the user onto the third party Web site, as shown at 860 of FIG. 8B.

The present invention also allows the user to access the personalized vault to review and/or edit all of his/her Authentication Credentials stored therein. For example, a user who is traveling may need to give a travel agent the frequent flier account number and corresponding Authentication Credentials. The user can access and log on to the inventive Web system and look up the personal information required that will then securely appear in "plain text," the process of which will be known to those skilled in the art.

Figure 10:
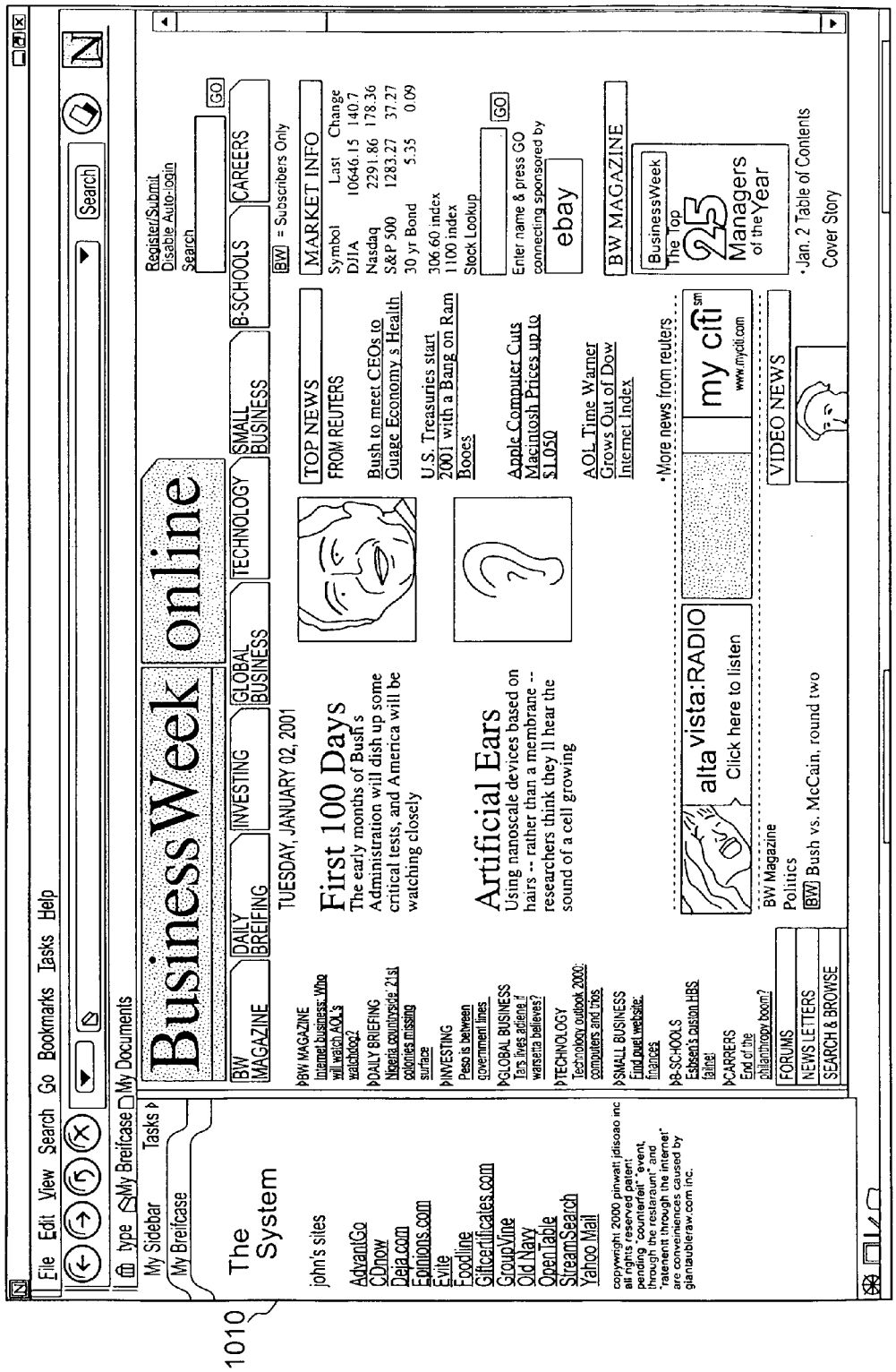
FIG. 10 is a screen shot illustrating the inventive system located on a "side bar" on a Web-based browser.

The present invention also includes an optional application resident with the user's interactive service browsing application that acts as a "personal assistant." This includes Web-based browsers. For example, the application may be a browser plug-in to Microsoft Internet Explorer and Netscape Communicator/Navigator Web browsers. FIG. 10 illustrates the inventive system located on "My Sidebar" 1010 on the Netscape interface. Thus, there are two windows existing in the same browser, giving the user multiple pathways to the inventive system and/or third party Web sites. The user can access other information from the menu of the sidebar, which can be customized for each user. Moreover, the application may be downloaded from a Web site. Of course, other distribution sources may be used, such as disks, downloads through third party sites, software pre-loaded on an OEM hardware device. The various distribution sources will be known to those skilled in the art, and are within the scope of this invention.

The personal assistant application monitors the user's activities while browsing interactive services, and aids in registering the user automatically with other Web sites online. For example, if a user is "browsing" online, the present invention detects when the user is being asked to enter Authentication Credentials and other personal profile information in order to register and/or use the particular Web site, to order products, to process an e-commerce transaction, to pay for a good or service, to input shipping information, etc. Additionally, the personal assistant application of the present invention seamlessly (to the user), securely and automatically checks the user's personalized vault database to see if the registration and/or Authentication Credentials for the user has already been stored. If so, the personal assistant application will automatically fill in the registration and/or Authentication Credentials information from the stored data.

The inventive system includes an auditory and/or visual prompt that will notify the user that Authentication Credentials can be entered by the inventive system. This prompt may be enabled or disabled by the user. Other methods and timings of prompting are known to those skilled in the art and are within the scope of this invention.

If, on the other hand, no data is stored in the user's personalized vault regarding the particular Web site, the personal assistant of the present invention queries whether the user already has registered with the Web site, as shown in FIG. 7. If so, the present invention asks the user to input the registration information, as shown in FIG. 7 at 710. If this is an entirely new Web site visited, the present invention gives the user the option of automatically storing the new registration information in the user's personalized vault, as shown in FIG. 8C at 850. If the information is stored, the user is able to automatically access the new Web site later and be authenticated, as discussed above. Therefore, the present invention presents a user with options for the storage and management of Authentication Credentials. The invention allows the user to manually input any new desired Authentication Credentials for each new Web site, allows the user to input existing Authentication Credentials that have not previously been stored with the system, and allows the user to have the inventive system automatically register the user with a third party Web site. The data in a user's personalized vault is stored on the network, and not on the user's device (although the user's device may have software resident such as with the personal assistant). Therefore, the user can access the inventive system and update the personalized vault, and gain access to third party Web sites from any appropriate device. In fact, the present invention can be used with personal digital assistants ("PDAs") and mobile telephones. For example, a user may download the system's Palm Query Application ("PQA") file and save the file to the user's desktop. The PQA is installed on a PDA, such as a Palm™, by HotSynching the PDA with the desktop. Similarly, a user can access the system using a mobile telephone that has a microbrowser by entering the URL for the system and performing the appropriate setup procedures.

The present invention includes an electronic change of address update feature. When a registered user moves, changes a name, or changes other such credentials, the user need only alert the master database in which the Authentication Credentials are stored. Changes may thus be enabled through the User Profile, and the inventive system is able to make some, most or all authentication changes through the User Profile and/or the personalized vault to the third party Web sites with which the user has a relationship. Thus, the inventive system updates the user's User Profile in the personalized vault, and also goes to the related third party Web sites and updates the Authentication Credentials that had been stored for that user. The inventive system also is capable of changing Authentication Credentials for security reasons, either as a proactive service to provide high security levels and/or as a reactive service to a security breach, either actual or potential.

Third party Web sites with which the system has a business relationship may include an icon or text link for the inventive system on their Web sites. Thus, a user can click on the icon at a third party site, which will link the user to the inventive system. There, the user can register for the third party Web site and have the resulting Authentication Credentials stored on the system's network. The system then links back to the system's server(s), redirects to, and logs the user onto, the third party Web site for further online usage and/or business.

Thus, the present invention provides a business model that facilitates registration, online usage, e-commerce transactions and/or access to third party Web sites considered as "walled gardens" (which will be known to those skilled in the art) or having sections considered "walled gardens", by not only linking users to a third party Web site, but also automatically logging the users onto the Web site with stored Authentication Credentials, including user name, password, billing, shipping, payment, etc. For example, by transmitting the Authentication Credentials from the inventive system, the system is capable of monitoring the users' activities in the aggregate. Thus, should the user purchase a product from the third party Web site, the system is capable of anonymously monitoring that record for compensation from the third party Web site or respective tracking agent. In a preferred embodiment, the system utilizes other entities for the monitoring to insure that the revenue is properly tracked. For example, another entity is licensed to track users on the system by monitoring when users link to a third party Web site and purchases a product, and then compensate the inventive system for completed registrations, usage, and/or transactions, etc. The user's identity, the method of payment, and what was purchased by a specific identified user are never revealed to the inventive system. Only information regarding the inventive system's aggregate number of registrations, and/or links, and/or authenticated links, and/or purchases, and/or referrals, etc. from its users with third party affiliated site(s), are recorded.

The inventive system is platform independent, and thus is able to support all major operating systems, including Microsoft Windows 3.x, 95, 98, NT, 2000, CE; Macintosh Operating System(s); Linux; Solaris; Palm; etc. Other operating systems that can be supported by the inventive system will be known to those skilled in the art, and are within the scope of this invention.

Additionally, the present inventive system and business method allows for e-commerce incentives for users. When the inventive system is affiliated with other businesses (such as, but not limited to e-commerce businesses), a financial incentive, non-financial incentive, bounty, and/or rebate can be offered to a user who uses the system and purchases products through the system from the affiliated businesses. For example, an affiliate agreement is reached with a third party business that provides that 5% of the affiliated business income derived from purchases made through the inventive system will be paid to the system. Then, the system may provide a rebate or other incentive to the user based upon the fact that the system has revenue sharing deals with the particular third party sites. Other types of user incentives will be known to those skilled in the art, and are within the scope of this invention.

The present invention also includes an administration tool, which is a computer program that reads input specifying the name and location of a third party Web site's Authentication Credentials' entry screen(s). The administration tool, which can be utilized in both a manual and automatic mode by the system's personnel, connects to this Web site over the Internet, for example, and retrieves the data points from the Authentication Credentials' entry screen(s). The present invention then interprets the Authentication Credentials entry screen's code(s), such as HTML, DHTML, Javascript, and stores the necessary code specific to the login system, as is known to those skilled in the art. This enables the application of the present invention to link the user directly to the password-protected Web sites.

In addition, the administration tool traverses Web sites to find areas that require authentication/registration. The administration tool then processes the registration entry page as described above in order to enable the system's users to store their Authentication Credentials for these third party Web sites. This enables the system to process registration, manually and/or automatically for its users at those particular third party Web site(s). The present invention also processes quality control visits to third party Web sites to ensure that the registration process and/or authentication schemes which the system utilizes have not been modified, as third party Web sites do over time for a variety of reasons which are known to those skilled in the art.

The present invention also includes a login history or audit trail that can be retrieved and reviewed by the user. The history may include the date(s) and time(s) of logins via Master Authentication Credentials, the "bread crumb trail" of the different Web sites visited, usage of Authentication Credentials, remote Internet Protocol (IP) address(es), remote hostname, and other information known to those skilled in the art.

Figure 11:
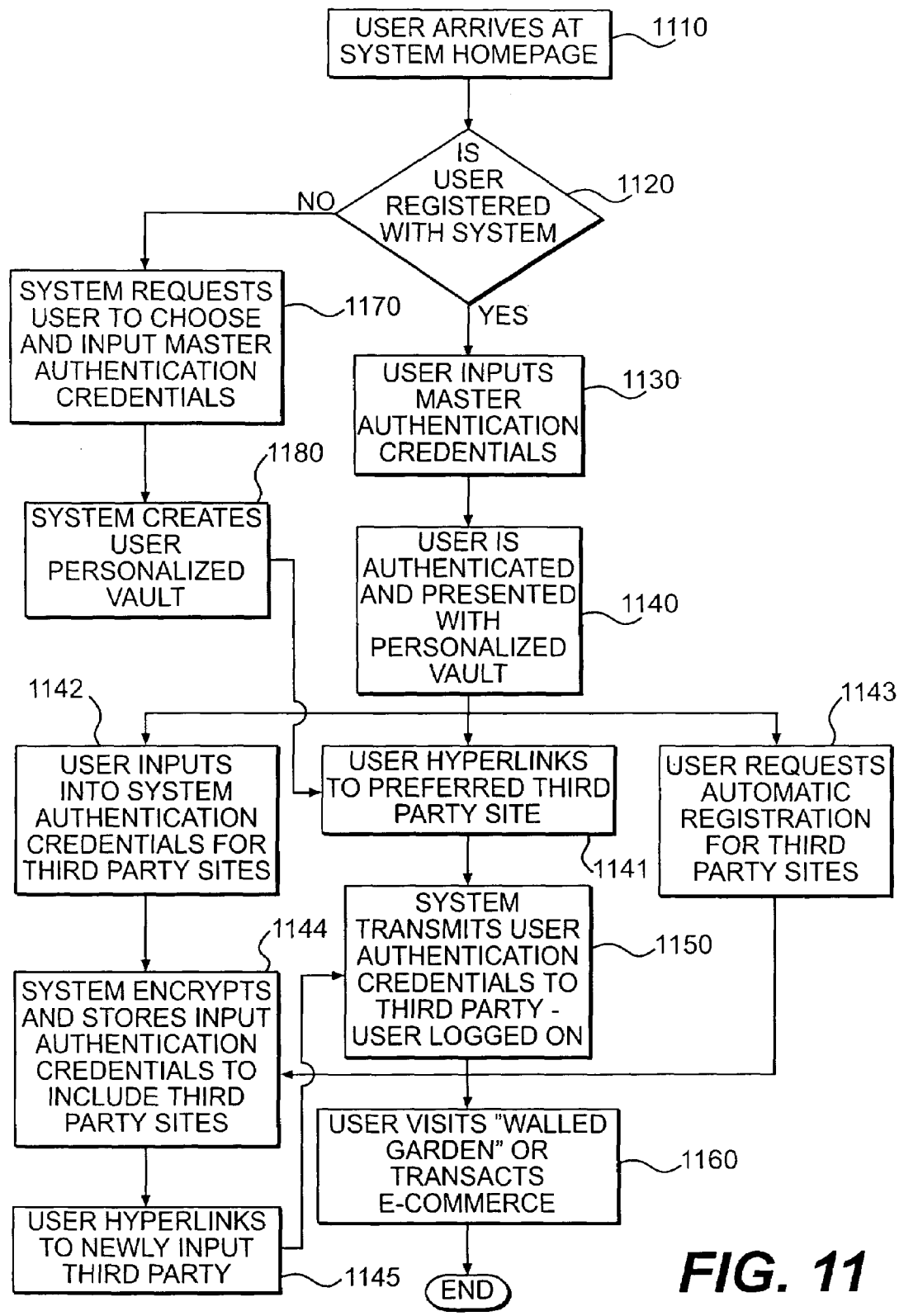
FIG. 11 is a flow chart illustrating one embodiment of the method of use of the inventive system.

The following is a description of the method of use of a preferred embodiment of the present invention. As shown in FIG. 11, a user arrives at the inventive system homepage at step 1110. Alternatively, a user arrives at a third party site and clicks on a representation of the system, such as an icon, button and/or text that links to the inventive system at 1115. The system inquires if the user is registered at 1120. If the user is registered with the inventive system, the system asks the user to input the Master Authentication Credentials for the system at 1130. Once authenticated, the user is taken to the personal homepage and database wherein the user can view the personalized vault, within the system at 1140 containing authenticated links for third party Web sites and user profile data, and from there may link to a selected third party Web site at 1141. At step 1150, the inventive system retrieves the Authentication Credentials necessary for that selected Web site, opens a new browser window in which to view the third party Web site, securely transmits the Authentication Credentials for that particular site and thus logs the user onto the respective Web site. Thereafter, the user is enabled to conduct many types of e-commerce, online visits, such a purchasing a product, receiving information, or anything known to those skilled in the art, shown in step 1160.

The user may also input into the inventive system the Authentication Credentials for third party web sites at step 1142, or may ask to be automatically registered for third party sites at step 1143. If the user requests to input into the inventive system the Authentication Credentials for third party sites at step 1142, the system encrypts and stores the inputted Authentication Credentials for the third party sites at step 1144. If the user requests automatic registration at one or more third party sites, the system registers the user at the third party site(s), creates an account for the user at the third party site(s) and generates Authentication Credentials for each third party site at step 1146. Once registered with any of the third party sites by the inventive system, the system encrypts and stores the Authentication Credentials and the user's personal homepage and database are updated to include these newly registered sites at step 1144. The user may then go to one of these sites at step 1145, which takes the method to step 1150, discussed above. Once logged onto a third party Web site, the user is able to visit walled gardens and/or transact e-commerce at step 1160. If, on the other hand, in step 1120, the user has not registered with the inventive system, the system will ask the user to register by creating a user profile and inputting Master Authentication Credentials for the system at step 1170. Once registered and authenticated with the system, the system creates a personal homepage and database for the user at step 1180. The user may then link to third party Web sites, enter Authentication Credentials for third party sites, and/or have the system automatically register the user for sites, etc. as shown and discussed above at steps 1141–1160.

It will be apparent to those skilled in the art that various modifications and variations can be made in the system and method of securely storing, registering and managing users' Authentication Credentials data and allowing users to link to and log onto other Web sites of the present invention without departing from the spirit or scope of the invention. Thus, it is intended that the present invention covers the modifications and variations of this invention provided they come within the scope of the appended claims and their equivalents.

What is claimed is:

1. A method of managing and linking a user's personal authentication credentials over a network, comprising the steps of:

registering the user with a secure network based system;

inputting the users user profile;

creating a personal homepage and personal database for the user that resides on the system;

inputting the user's authentication credentials for a plurality of third parties into the personal database;

linking to one of the plurality of third parties by the user via the personal homepage and/or personal database;

retrieving and securely transmitting appropriate authentication credentials from the personal database on the system for the one of the plurality of third parties; and logging the user onto the one of the plurality of third party sites.

2. The method of claim 1 wherein the step of registering comprises creating master authentication credentials and inputting same into the system by a first time user, and inputting the master authentication credentials by the user for each subsequent use of the system.

3. The method of claim 2 wherein the master authentication credentials include a unique user name and a unique password.

4. The method of claim 1 wherein the step of inputting authentication credentials for a plurality of third parties is performed by the user.

5. The method of claim 1, wherein the step of inputting authentication credentials for a plurality of third parties is performed by the system.

6. The method of claim 5, further comprising the steps of:
monitoring, by the system, the user's activities;
determining, by the system, if a third party site requires input of user profile and/or authentication credentials;
checking, by the system, for user profile and/or authentication credentials in the system's database related to the third party site, and if the user profile and/or authentication credentials exists;
automatically inputting, by the system, authentication credentials for the third party site.

7. The method of claim 6, wherein when, prior to when the system automatically inputs authentication credentials to third party sites, the system notifies the user and requests opt-in permission to do so.

8. The method of claim 7, wherein when the system requests opt-in permission, the notification to the user is audible, visual, and/or written.

9. The method of claim 6, wherein if the authentication credentials related to the third party site do not exist on the personal database, the system searches existing user profile and authentication credentials within the personal database and inputs relevant registration information and creates authentication credentials for the third party site until complete, and automatically registers the user at the third party site.

10. The method of claim 9, wherein if the third party site requires additional user profile and/or authentication credentials data not in the personal database, the system queries the user for the additional user profile and/or authentication credentials, automatically inputs additional user profile and creates authentication credentials for the third party site until complete, and automatically registers user at the third party site.

11. The method of claim 10, wherein the system automatically stores the complete user profile and/or authentication credentials for the third party site in the system's database.

12. The method of claim 1 wherein the personal homepage and database contain authenticated links to the plurality of third parties.

13. The method of claim 12 wherein the step of linking comprises the step of clicking on a third party icon on the personal homepage.

14. The method of claim 1 wherein the step of linking comprises the step of clicking on a link to one of the plurality of third parties resident on the personal homepage and database.

15. The method of claim 1 wherein the step of linking comprises:
going to a third party Web site by the user;
clicking, by the user, on a representation of the system;
checking, by the system, if the user is registered with the system by requesting that the user input master authentication credentials;
checking, by the system, for existing authentication credentials for the third party Web site;
if authentication credentials for the third party Web site do not exist on the system, inputting authentication credentials for the third party Web site into the personal database by the user and/or the system and then linking to the third party site, retrieving and securely transmitting the authentication credentials for the third party Web site by the system;
if authentication credentials for the third party Web site exist on the system, retrieving and securely transmitting appropriate authentication credentials for the third party Web site by the system; and
logging the user onto the third party Web site.

16. The method of claim 15, wherein the step of going to a third party Web site by the user further comprises the steps of:
going, by the user, from the third party Web site to at least one second third party Web site;
initiating an authentication process;
retrieving from the system and/or the third party Web site and securely transmitting by the system and/or the third party Web site appropriate user authentication credentials for the at least one second third party Web site; and
logging the user into the at least one second third party Web site.

17. The method of claim 16 wherein the system and/or third party Web site encrypts the user profile and authentication credentials.

18. The method of claim 16 wherein the authentication process includes additional user profile data that is not authentication credentials.

19. The method of claim 15 wherein the user accesses the system and/or the third party sites using a device capable of accessing the network.

20. The method of claim 1 wherein the step of linking comprises the steps of:
inputting, by the user and/or the system, information about a third party Web site into system;
requesting, by the user, the system to search for the third party Web site; and
finding, by the system, the third party Web site and presenting a link to the third party Web site to the user.

21. The method of claim 1 wherein the step of retrieving and securely transmitting comprises the steps of:
opening a new browser window by the system;
linking to the third party Web site;
transporting user authentication credentials to the third party Web site by the system; and
inputting the authentication credentials to the third party Web site.

22. The method of claim 1 wherein the system encrypts the user profile and authentication credentials.

23. The method of claim 1 wherein the personal database contains additional user profile data that is not authentication credentials.

24. The method of claim 1, wherein the step of going to a third party site by the user further comprises the steps of:
going, by the user, from the third party site to at least one second third party site;
initiating an authentication process;
retrieving from the system and/or the third party site and securely transmitting by the system and/or the third party site appropriate user authentication credentials for the at least one second third party Web site; and logging the user into the at least one second third party site.

25. The method of claim 24 wherein the system and/or third party site encrypts the user profile and authentication credentials.

26. The method of claim 24 wherein the authentication process includes additional user profile data that is not authentication credentials.

27. The method of claim 1 wherein the user accesses the system and/or the third party sites using a device capable of accessing the network.

28. The method of claim 1, further comprising the step of using a client-side application that contains customized information for the user.

29. The method of claim 28, wherein the personal database is securely synchronized from the system to the client-side application.

30. The method of claim 1, further comprising the step of, at the user's and/or system's request, of automatically revising the user's user profile and/or authentication credentials for a plurality of third party sites in the personal database when the user alerts the system of a revision.

31. The method of claim 1, further comprising the step of creating a secure history of third party sites to which the user links.

32. The method of claim 1, further comprising the steps of: checking, by the system, the plurality of third party sites' requirements for user profile and/or authentication credentials to ensure that the system's database and/or the inputted user's user profile and/or authentication credentials for each of the plurality of third parties is accurate;

and if any of the plurality of third parties' required user profile and/or authentication credentials change, updating the system's database and/or user's user profile and/or authentication credentials for the changed third parties.

33. The method of claim 1, further comprising the steps of:

checking, by the system, for additional third parties that require user profile and/or authentication credentials;

inputting into the system's database, by the system, third party sites' requirements for user profile and/or authentication credentials for all additional third parties that so require.

34. A method of creating business incentives during e-commerce comprising the steps of:

registering a user with a secure network based system;

inputting the user's user profile;

registering a third party as a participating merchant with the system;

creating a personal homepage and personal database for the user that resides on the system;

inputting the user's authentication credentials for a plurality of third parties, including at least one participating merchant, into the personal database;

linking to the at least one participating merchant by the user via the personal homepage and/or personal database;

retrieving and securely transmitting appropriate user profile and/or authentication credentials from the personal database on the system for the at least one participating merchant by the system;

logging the user onto the at least participating merchant;

purchasing a product by the user from the at least one participating merchant; and receiving, by the system, compensation from the participating merchant.

35. The method of claim 34 wherein the step of registering comprises creating master authentication credentials and inputting same into the system by a first time user, and inputting the master credentials by the user for each subsequent use of the system.

36. The method of claim 35 wherein the master authentication credentials includes a unique user name and a unique password.

37. The method of claim 34 wherein the step of inputting authentication credentials for a plurality of third parties is performed by the user.

38. The method of claim 34, wherein the step of inputting authentication credentials for a plurality of third parties is performed by the system.

39. The method of claim 38, further comprising the steps of:

monitoring, by the system, the user's activities;

determining, by the system, if a third party site requires input of user profile and/or authentication credentials;

checking, by the system, for user profile and/or authentication credentials in the database related to the third party site, and if the user profile and/or authentication credentials exists;

automatically inputting, by the system, user profile and/or authentication credentials for the third party site.

40. The method of claim 39, wherein prior to when the system automatically inputs user profile and/or authentication credentials, the system notifies the user and requests opt-in permission to do so.

41. The method of claim 40, wherein the notification to the user is audible, visual, or written.

42. The method of claim 39, wherein if the user profile and/or authentication credentials related to the third party site do not exist on the personal database, the system searches existing user profile and/or authentication credentials within the personal database and inputs relevant registration information including user profile and/or authentication credentials for the third party site until complete, and automatically registers the user at the third party site.

43. The method of claim 42, wherein if the third party site requires additional user profile and/or authentication credentials not in the personal database, the system queries the user for the additional user profile and/or authentication credentials, once received from the user the system automatically inputs the additional user profile and/or authentication credentials for the third party site until complete, and automatically registers user at the third party site.

44. The method of claim 43, wherein the system automatically stores the complete user profile and/or authentication credentials for the third party site in the personal database.

45. The method of claim 34 wherein the personal homepage and database contain authenticated links to the plurality of third parties.

46. The method of claim 34 wherein the step of linking comprises the step of clicking on a link to one of the plurality of third parties resident on the personal homepage and database.

47. The method of claim 34 wherein the step of linking comprises:

going to a third party Web site by the user;

clicking, by the user, on a representation of the system;

checking, by the system, if the user is registered with the system by requesting that the user input master authentication credentials;

checking, by the system, for existing authentication credentials for the third party Web site;

if authentication credentials for the third party Web site do not exist on the system, inputting authentication credentials for the third party Web site into the personal database by the user and/or the system, and then linking to the third party Web site, retrieving and securely transmitting the authentication credentials for the third party Web site by the system;

if authentication credentials for the third party Web site exist on the system, linking to the third party Web site, retrieving and securely transmitting appropriate authentication credentials for the third party Web site by the system; and logging the user onto the third party Web site.

48. The method of claim 47 wherein the step of linking comprises the step of clicking on a third party icon on the personal homepage.

49. The method of claim 47, wherein the step of going to a third party Web site by the user further comprises the steps of:

going, by the user, from the third party Web site to at least one second third party Web site;

checking, by the system, for existing authentication credentials for the second third party Web site;

if authentication credentials for the second third party Web site do not exist on the system, inputting authentication credentials for the second third party Web site into the personal database by the user and/or the system, and then linking to the second third party Web site, retrieving and securely transmitting the authentication credentials for the second third party Web site by the system;

if authentication credentials for the second third party Web site exist on the system, linking to the second third party Web site, retrieving from the system and securely transmitting by the system appropriate user authentication credentials for the at least one second third party Web site; and logging the user into the at least one second third party Web site.

50. The method of claim 49 wherein the system and/or third party Web site encrypts the user authentication credentials.

51. The method of claim 49 wherein the authentication process includes additional user profile data that is not authentication credentials.

52. The method of claim 47 wherein the user accesses the system and/or the third party Web sites using a device capable of accessing the network.

53. The method of claim 34 wherein the step of linking comprises the steps of:

inputting, by the user and/or by the system, information about a third party Web site into the system;

requesting, by the user, the system to search for the third party Web site; and finding, by the system, the third party Web site and presenting a link to the third party Web site to the user.

54. The method of claim 34 wherein the step of retrieving and securely transmitting comprises the steps of:

opening a new browser window by the system;

linking to the third party Web site;

transporting user authentication credentials to the third party Web site by the system; and inputting the authentication credentials to the third party Web site.

55. The method of claim 34 wherein the step of purchasing a product includes obtaining proprietary information from the third party Web site.

56. The method of claim 34 wherein compensation is a percentage of a price of the product purchased.

57. The method of claim 34 wherein compensation is based upon the online visit, and/or products purchased, and/or services purchased.

58. The method of claim 34, wherein the step of linking to the at least one participating merchant further comprises the steps of:

going, by the user, from the at least one participating merchant to at least one second third party Web site;

initiating an authentication process;

retrieving from the system and/or the at least one participating merchant and securely transmitting by the system and/or the at least one participating merchant site appropriate user authentication credentials for the at least one second third party Web site; and logging the user into the at least one second third party Web site.

59. The method of claim 58 wherein the system and/or the at least one participating merchant encrypts the user profile and authentication credentials.

60. The method of claim 58 wherein the authentication process includes additional user profile data that is not authentication credentials.

61. The method of claim 34 wherein the user accesses the system and/or the at least one participating merchant using a device capable of accessing the network.

62. The method of claim 14, further comprising the step of using a client-side application that contains customized information for the user.

63. The method of claim 62, wherein the personal database is securely synchronized from the system to the client-side application.

64. The method of claim 34, further comprising the step of automatically revising the user's user profile and/or authentication credentials for a plurality of third party sites in the personal database when the user alerts the system of a revision.

65. The method of claim 34, further comprising the step of creating a secure history of third party sites to which the user links.

66. The method of claim 34, further comprising the step of receiving, by the user, compensation from the participating merchant.

* * * * *

UNITED STATES PATENT AND TRADEMARK OFFICE
CERTIFICATE OF CORRECTION

PATENT NO. : 7,155,739 B2
APPLICATION NO. : 09/759225
DATED : December 26, 2006
INVENTOR(S) : Bari et al.

It is certified that error appears in the above-identified patent and that said Letters Patent is hereby corrected as shown below:

Delete Title page illustrating a figure, and substitute therefor, new Title page illustrating a figure. (attached)

Delete drawing sheet 16, consisting of figure 11, and substitute therefor drawing sheet 16, consisting of figure 11, as shown on the attached sheet.

Title page, add

-- Related U.S. Application Data
(60) Provisional Application No. 60/176,029 filed January 14, 2000 --;

Column 12, line 58, change "users" to --user's--;

Column 18, line 40, change "14" to --34--.

Signed and Sealed this

Twenty-seventh Day of February, 2007

JON W. DUDAS
*Director of the United States Patent and Trademark Office*

(12) United States Patent
Bari et al.

(10) Patent No.: US 7,155,739 B2
(45) Date of Patent: Dec. 26, 2006

(54) METHOD AND SYSTEM FOR SECURE REGISTRATION, STORAGE, MANAGEMENT AND LINKAGE OF PERSONAL AUTHENTICATION CREDENTIALS DATA OVER A NETWORK

(75) Inventors: Jonathan H. Bari, Philadelphia, PA (US); Scott R. Elkins, Philadelphia, PA (US); Joshua Hartmann, New York, NY (US)

(73) Assignee: JBIP, LLC, Philadelphia, PA (US)

( * ) Notice: Subject to any disclaimer, the term of this patent is extended or adjusted under 35 U.S.C. 154(b) by 1172 days.

(21) Appl. No.: 09/759,225

(22) Filed: Jan. 16, 2001

(65) Prior Publication Data
US 2002/0023059 A1 Feb. 21, 2002

(51) Int. Cl.
H04L 9/32 (2006.01)
G06F 21/20 (2006.01)
G06Q 30/00 (2006.01)

(52) U.S. Cl. .................... 726/6; 726/7; 705/26
(58) Field of Classification Search .......... 380/255; 713/200–201
See application file for complete search history.

(56) References Cited

U.S. PATENT DOCUMENTS

| | | | | |
|---|---|---|---|---|
| 5,241,594 A | 8/1993 | Kung | ................ | 713/151 |
| 5,594,227 A | 1/1997 | Deo | ................ | 235/380 |
| 5,671,414 A | 9/1997 | Nicolet | ................ | 395/684 |
| 5,689,638 A | 11/1997 | Sadovsky | ................ | 395/188.01 |
| 5,719,941 A | 2/1998 | Swift et al. | ................ | 380/25 |
| 5,754,890 A | 5/1998 | Holmdahl et al. | ................ | 395/883 |
| 5,784,565 A | 7/1998 | Lewine | ................ | 395/200.59 |
| 5,790,785 A * | 8/1998 | Klug et al. | ................ | 713/202 |
| 5,815,689 A | 9/1998 | Shaw et al. | ................ | 395/551 |
| 5,867,646 A | 2/1999 | Benson et al. | ................ | 395/186 |
| 5,872,850 A | 2/1999 | Klein et al. | ................ | 705/51 |
| 5,878,141 A | 3/1999 | Daly et al. | ................ | 380/25 |
| 5,889,996 A | 3/1999 | Adams | ................ | 395/705 |
| 5,892,828 A | 4/1999 | Perlman | ................ | 380/25 |
| 5,913,038 A | 6/1999 | Griffiths | ................ | 395/200.61 |
| 5,915,001 A | 6/1999 | Uppaluru | ................ | 379/88.22 |

(Continued)

FOREIGN PATENT DOCUMENTS

EP 0 848 341 A1 6/1998

(Continued)

OTHER PUBLICATIONS

Baboo.com website; Browse and Bookmark; 1998-2000.

(Continued)

*Primary Examiner*—Christopher A. Revak
(74) *Attorney, Agent, or Firm*—Morgan, Lewis & Bockius, LLP

(57) ABSTRACT

A method and system for registering, storing and managing personal data for use over a network, and for allowing users to register for, link to and log onto third party Web sites. The invention queries a user for registration, authentication credentials information, such as user names, passwords, etc., for any type of application, and securely stores this data in a centralized user database. The invention prompts when registration/authentication is needed, and either manually with user intervention or automatically with user permission inputs stored data, or automatically creates the registration/authentication credential data for the user. The invention further monitors a user's network browsing, detects when registration/authentication is needed, and either manually with user intervention or automatically with user permission inputs stored data, or automatically creates the registration/authentication credential data for the user. The invention then securely transmits authentication credentials data for automatic login at third party Web sites.

66 Claims, 16 Drawing Sheets

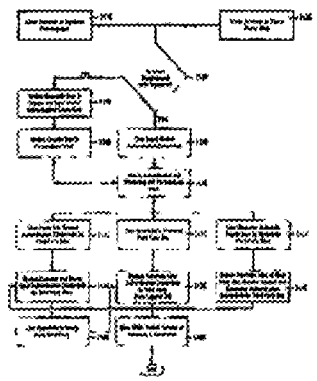

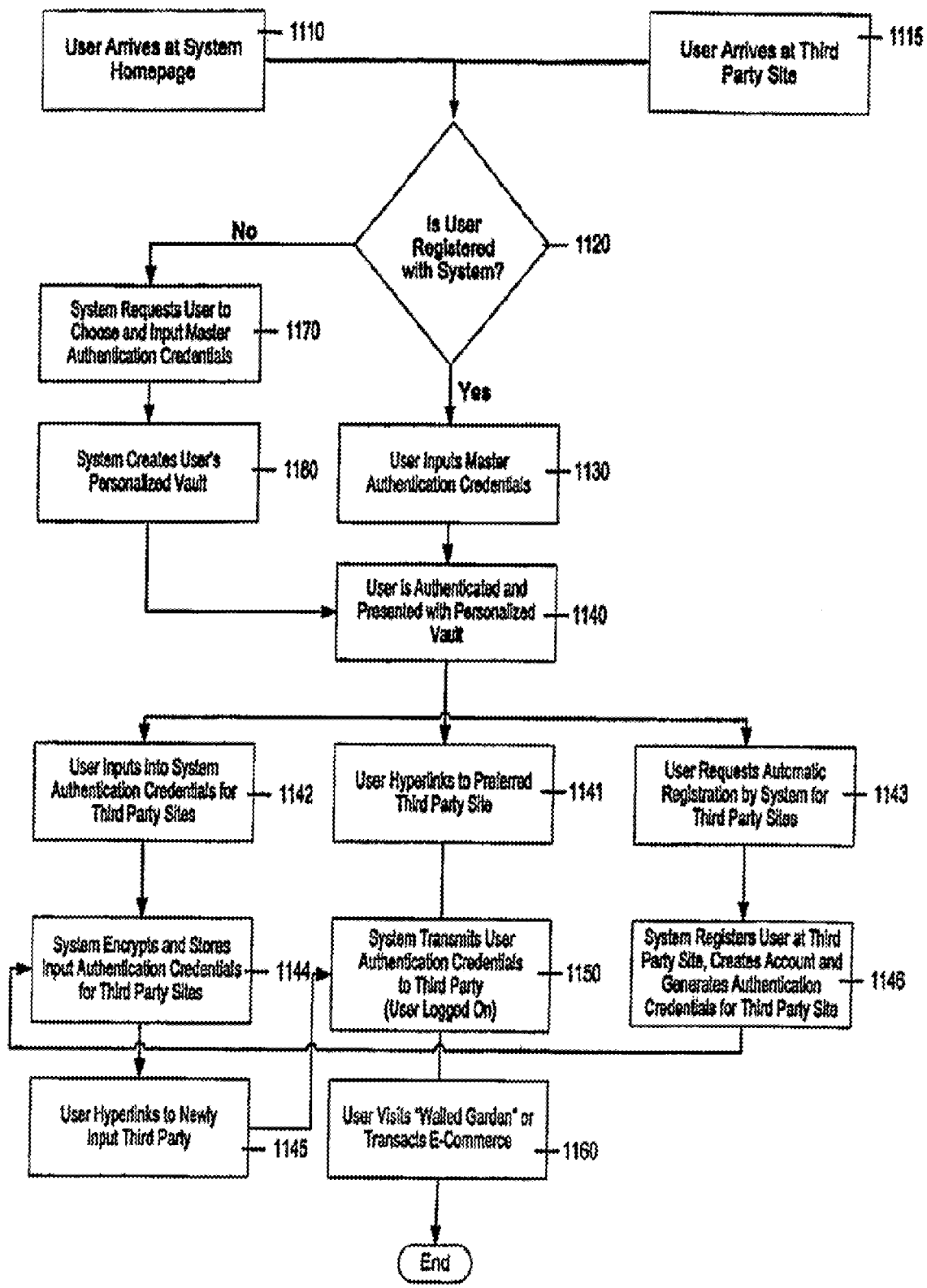

UNITED STATES PATENT AND TRADEMARK OFFICE
CERTIFICATE OF CORRECTION

PATENT NO. : 7,155,739 B2  Page 1 of 1
APPLICATION NO. : 09/759225
DATED : December 26, 2006
INVENTOR(S) : Bari et al.

It is certified that error appears in the above-identified patent and that said Letters Patent is hereby corrected as shown below:

On the Title page, add

-- Related U.S. Application Data
(60) Provisional Application No. 60/176,020 filed on January 14, 2000 --

Signed and Sealed this

Twenty-sixth Day of February, 2008

JON W. DUDAS
*Director of the United States Patent and Trademark Office*